United States Patent
Kamiguchi et al.

(10) Patent No.: US 6,338,003 B1
(45) Date of Patent: Jan. 8, 2002

(54) DATA DISPLAY/INPUT METHOD FOR CNC APPARATUSES USED AS ONLINE TERMINALS

(75) Inventors: Masao Kamiguchi, Minamitsuru-gun; Atsushi Horiuchi; Chikara Ookuma, both of Oshino-mura; Issei Kashiwagi, Fujiyoshida, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 08/952,407

(22) PCT Filed: Mar. 13, 1997

(86) PCT No.: PCT/JP97/00799

§ 371 Date: Jan. 21, 1998

§ 102(e) Date: Jan. 21, 1998

(87) PCT Pub. No.: WO97/34207

PCT Pub. Date: Sep. 18, 1997

(30) Foreign Application Priority Data

Mar. 13, 1996 (JP) .............................................. 8-83032

(51) Int. Cl.⁷ .............................................. G06F 19/00
(52) U.S. Cl. .......................... 700/169; 700/182; 700/83
(58) Field of Search ................................ 700/169, 170, 700/174, 175, 177, 180, 182, 83; 340/825.06; 318/578

(56) References Cited

U.S. PATENT DOCUMENTS

| | | | | |
|---|---|---|---|---|
| 4,648,028 A | * | 3/1987 | DeKlotz et al. | 700/83 |
| 4,815,190 A | * | 3/1989 | Haba, Jr. et al. | 29/711 |
| 5,117,169 A | * | 5/1992 | Kakino et al. | 318/578 |
| 5,239,476 A | * | 8/1993 | James et al. | 364/164 |
| 5,247,453 A | * | 9/1993 | Mimura et al. | 700/169 |
| 5,262,954 A | * | 11/1993 | Fujino et al. | 700/169 |
| 5,274,546 A | * | 12/1993 | Kinoshita | 900/177 |
| 5,291,416 A | * | 3/1994 | Hutchins | 700/174 |
| 5,367,624 A | | 11/1994 | Cooper | |
| 5,383,110 A | * | 1/1995 | Fujita et al. | 700/180 |
| 5,386,360 A | * | 1/1995 | Wilson et al. | 364/183 |
| 5,726,912 A | * | 3/1998 | Krall, Jr. et al. | 702/186 |

FOREIGN PATENT DOCUMENTS

| | | |
|---|---|---|
| EP | 0 266 784 | 5/1988 |
| JP | 62-256006 | 11/1987 |
| JP | 2-64711 | 3/1990 |
| JP | 4-60811 | 2/1992 |
| JP | 4-169908 | 6/1992 |
| JP | 4-293105 | 10/1992 |
| JP | 5-2203 | 1/1993 |
| JP | 6-314113 | 11/1994 |

OTHER PUBLICATIONS

Brueggemann U: "Integriertes Bedienfeld ein Neuer Weg Der Informationsverabeitung an der Werkezeugmaschine", vol. 86, No. 5, May 1, 1991, pp. 226–229.

* cited by examiner

Primary Examiner—William Grant
Assistant Examiner—Kidest Bahta
(74) Attorney, Agent, or Firm—Staas & Halsey LLP

(57) ABSTRACT

A data display/input method for a CNC apparatus without necessity of using a personal computer which has been served as a relaying device between the CNC apparatus and a host computer and also as a display device, and also capable of constructing an FA network system at low cost. A display screen of the CNC apparatus is split into first and second display areas so that information transferred from the host computer to the CNC apparatus is displayed in the first display area while information inputted to the CNC apparatus by the operator is displayed in the second display area. Display attributes in the CNC apparatus are switched in accordance with display attributes specified by the information transferred to the CNC apparatus from the host computer, whereby restrictions on a data display of the CNC apparatus are removed, permitting text data and graphic data to be displayed.

13 Claims, 21 Drawing Sheets

```
CODE: 9999/9999 MACHINE NO. : P9601TF                    MON DEC 30 17:20
CUSTOMER NAME : ****** INDUSTRY CO., LTD.                SHIPPING SCHEDULE: 01/01 16:00
                        ASSEMBLING SYSTEM MAIN MENU
1. INSTRUCTION AND SETTING FOR TEST AND CHECK   12. QUERY ON NONEXECUTED TEST
2. SET PARAMETERS                               13. REFER TO MANUAL
3. LASER MEASUREMENT                            14. REFER TO OUT-OF-STOCK PARTS INFORMATION
4.                                              15.
5.                                              16.
6. AUTOMATIC ADJUSTMENT                         17. REGISTER/RE-REGISTER MACHINE NO.
7. RUNNING TEST
8.
9.
10. QUERY ON SHIPPING SPECIFICATIONS            99. END
11.
        SELECT NO. AND PRESS EXECUTE KEY        A01: [      ]
        [ENTRY PERMITTED]
```

|  |  | EXECUTE |  | DISCONNECT LINE |  |  |  | END |

FIG. 5

| CODE: 9999/9999    MACHINE NO. : P9601TF | MON DEC 30 17:20 |
| --- | --- |
| CUSTOMER NAME : ****** INDUSTRY CO. , LTD. | SHIPPING SCHEDULE: 01/01 16:00 |

1. TESTING/CHECKING INSTRUCTON MENU

6  INSPECTIONS OF APPEARANCE AND IMPORTANT PARTS

1) NO RUST, NO SCRATCH, NO PAINT PEELING, AND NO DEFORMATION — A01: Y
2) NO LOOSENING OF BOLTS, NUTS OR SCREWS — A02: Y
3) NO TOOL LEFT INSIDE MACHINE — A03: Y
4) NO OMISSION OF ATTACHMENTS — A04: Y
5) FINAL CONFIRMATION OF MACHINE NAMEPLATE ENTRY PERMITTED — A05: Y

ENTRY PERMITTED

| Y | N | NEXT ITEM | EXECUTE | PREVIOUS ITEM | DISCONNECT LINE | | | | END |

FIG. 6

```
CODE: 9999/9999    MACHINE NO. : P9601TF              MON DEC 30 17:20
CUSTOMER : ****** INDUSTRY CO,. LTD.                  SHIPPING SCHEDULE: 01/01 16:00
                        13. MANUAL REFERRING MENU

1. REFER TO ALARMS
         2. REFER TO ASSEMBLING INFORMATION
         3. REFER TO PARTS INFORMATION
         4. REFER TO CONTENTS OF OPERATION

SELECT NUMBER AND PRESS EXECUTE KEY     A01: [    1    ]
         [ENTRY PERMITTED]

|     |     | EXECUTE |     | DISCONNECT LINE |     |     |     | END |
```

FIG. 7

```
CODE: 9999/9999    MACHINE NO. : P9601TF              MON DEC 30 17:20
CUSTOMER : ****** INDUSTRY CO,. LTD.                  SHIPPING SCHEDULE: 01/01 16:00
                        13. 1 REFERRING TO ALARMS

INPUT ALARM NO.                              A01: [   414   ]

ALARM NO. : 414
              ALARM FOR ABNORMALITY OF 4TH-AXIS DIGITAL SERVO
              DETAILS
              CONTACTS OF ELECTROMAGNETIC CONTACTOR OF SERVO AMPLIFIER ARE FUSED
              INFORMATION ON PART MOUNTING POSITION NEEDED?    02: [   Y   ]

[ENTRY PERMITTED]

| Y | N | EXECUTE |     | DISCONNECT LINE |     |     |     | END |
```

FIG. 8

```
┌─────────────────────────────────────────────────────────────────────┐
│ CODE: 9999/9999   MACHINE NO.: P9601TF          MON DEC 30 17:20    │
│ CUSTOMER : ****** INDUSTRY CO,. LTD.      SHIPPING SCHEDULE: 01/01 16:00 │
│         14. REFERRING TO OUT-OF-STOCK PARTS INFORMATION             │
├─────────────────────────────────────────────────────────────────────┤
│                                                                     │
│   REGISTER SPECIFICATIONS OF PARTS RUNNING SHORT   A01: │A00B-1239-234│
│                                                                     │
│   ┌───────────────────────────────────────────────────────────┐     │
│   │ SPECIFICATION NO. : A00B-1239-234                         │     │
│   │ PART NAME: CABLE BRACKET                                  │     │
│   │ 10 PARTS ARE STOCKED IN AUTOMATIC WAREHOUSE               │     │
│   │ SHELF NO. IN WAREHOUSE IS A-214                           │     │
│   └───────────────────────────────────────────────────────────┘     │
│                                                                     │
│   │ENTRY PERMITTED│                                                 │
│                                                                     │
├─────┬─────┬─────┬────────┬─────┬──────────┬─────┬─────┬─────┬───────┤
│     │     │     │EXECUTE │     │DISCONNECT│     │     │     │ END   │
│     │     │     │        │     │   LINE   │     │     │     │       │
└─────┴─────┴─────┴────────┴─────┴──────────┴─────┴─────┴─────┴───────┘
```

FIG. 9

```
┌─────────────────────────────────────────────────────────────────┐
│ MACHINING ONLINE SYSTEM                      MON DEC 30 17:20   │
│                         MAIN MENU                               │
├─────────────────────────────────────────────────────────────────┤
│                                                                 │
│      1. REFER TO MACHINING SCHEDULE                             │
│      2. REQUEST MACHINING PROGRAM                               │
│      3. REFER TO MACHINING INSTRUCTION                          │
│      4. ALARM GUIDANCE                                          │
│                                                                 │
│                                                                 │
│         SELECT NUMBER AND PRESS EXECUTE KEY    A01: [      ]    │
│      ┌───────────────┐                                          │
│      │ENTRY PERMITTED│                                          │
│      └───────────────┘                                          │
├──┬──┬──┬────────┬──┬──────────┬──┬──┬──┬────┤
│  │  │  │EXECUTE │  │DISCONNECT│  │  │  │END │
│  │  │  │        │  │  LINE    │  │  │  │    │
└──┴──┴──┴────────┴──┴──────────┴──┴──┴──┴────┘
```

FIG. 10

```
┌─────────────────────────────────────────────────────────────────┐
│ MACHINING ONLINE SYSTEM                      MON DEC 30 17:20   │
│                    1. MACHINING SCHEDULE                        │
├─────────────────────────────────────────────────────────────────┤
│   ┌────────────────────────────────────────────────────┐        │
│   │CURRENT OPERATION 005:30 MIN. BEHIND SCHEDULE       │        │
│   └────────────────────────────────────────────────────┘        │
│   SPECIFICATION: V0123-001    JIG: CLAMPER A01                  │
│   PROGRAM: 010023             TIME REQUIRED: 2HRS. 30 MIN.      │
│   TOOL PATTERN: T0023         MATERIAL: ADC                     │
│   ┌────────────────────────────────────────────────────┐        │
│   │NEXT OPERATION 006 :                                │        │
│   └────────────────────────────────────────────────────┘        │
│   SPECIFICATION: V0123-005    JIG: CLAMPER A01                  │
│   PROGRAM: 010025             TIME REQUIRED: 3HRS. 30 MIN.      │
│   TOOL PATTERN: T0024         MATERIAL: ADC                     │
│   ┌───────────────┐                                             │
│   │ENTRY PERMITTED│                                             │
│   └───────────────┘                                             │
├──┬──┬──┬────────┬──┬──────────┬──┬──┬──┬────┤
│  │  │  │EXECUTE │  │DISCONNECT│  │  │  │END │
│  │  │  │        │  │  LINE    │  │  │  │    │
└──┴──┴──┴────────┴──┴──────────┴──┴──┴──┴────┘
```

FIG. 11

1. TOTALING OF OPERATION HOURS
2. ALARM ANALYSIS
3. PRODUCTION SCHEDULE
4. MAINTENANCE/CONTROL SYSTEM
5. MACHINING DATA CORRECTION (BASED ON LOAD)
6. MACHINING DATA CORRECTION (BASED ON DATA FROM MEASURING INSTRUMENT)

|  | X COORDINATE | Y COORDINATE | INPUT LENGTH | INPUT DATA TEMPORARY STORAGE FILE |
|---|---|---|---|---|
| ITEM 1 | COLUMN 60 | LINE 5 | 20 CHARACTERS | 23.5 |
| ITEM 2 | COLUMN 60 | LINE 8 | 20 CHARACTERS | 34.5 |
| . | . | . | . | . |
| . | . | . | . | . |
| . | . | . | . | . |
| . | . | . | . | . |

FIG. 16

DATA DISPLAY/INPUT METHOD FOR CNC APPARATUSES USED AS ONLINE TERMINALS

TECHNICAL FIELD

The present invention relates to an improvement on data display/input method for CNC apparatuses used as terminals of an online system.

BACKGROUND ART

There are known a network system in which a plurality of CNC apparatuses are connected to a host computer so that information can be shared among the operators of the CNC apparatuses and the host computer.

In conventional types of such network system, personal computers and the like connected to the network are used as relaying means, and information from the CNC apparatuses is sent to the host computer via the respective relaying means, so that the CNC apparatuses per se are incapable of making direct access to the host computer.

Further, in the conventional type, data input by the operator is first sent to the host computer from the personal computer and is processed by the host computer, and the result of the processing is transferred to the personal computer to be displayed on the screen thereof, so that each time the keyboard is operated on the CNC device side, the processing function of the host computer has to be used, and thus where a plurality of the CNC apparatuses or personal computers are provided, the load on the host computer increases, posing a problem that the processing operation of the host computer slows down.

In addition, since a personal computer or the like serving as the relay means is needed for each of the CNC apparatuses, the system construction cost increases, thereby reducing available floor space in the factory.

On the other hand, information from the host computer to the CNC apparatus side is displayed at the personal computer or the like according to the format previously incorporated into the personal computer or the like, which serves as a relay means, so that every information to be sent from the host computer to the CNC apparatus side needs to be designed in accordance with the format, giving rise to a problem that the information that the host computer can send to the CNC apparatus side is limited.

For example, the display area of the personal computer or the like as the relay means, is preassigned for text data, graphic data, etc., and also the position of the display area, the number of colors available for display, etc. are predefined by the software of the personal computer. Thus, the information that can be transferred for display from the host computer to the relay means is limited, causing a disadvantage that the information held by the host computer cannot be used effectively.

Also, when the data to be sent from the host computer to the personal computers has to be modified, every data format of each of the personal computers needs to be modified accordingly, making system change extremely complicate.

It is already a known practice to send emergency information from the host computer to the CNC apparatuses for display thereat; however, according to conventional method, the emergency information is displayed on the display screen in the same fashion according to the fixed format, regardless of the condition under which the CNC apparatuses are then used. Therefore, such emergency display sometimes not only becomes hindrance to the data or program editing operation by the operator but also causes the operator to overlook the emergency information, especially when the operator is away from the display screen.

DISCLOSURE OF INVENTION

An object of the present invention is to provide a data display/input method for a CNC apparatus, the method being capable of reducing the load of the host computer, permitting a variety of data held by the host computer, such as text data, numeric data, graphic data, etc., to be effectively used from the CNC apparatus side, eliminating the need of using personal computers as relay means, thereby reducing the cost necessary for system construction, and also permitting the floor space of a factory to be effectively used.

Another object of the present invention is to enable the CNC apparatus to access the host computer so that the host computer can effectively collect information of the CNC apparatus side.

Still another object of the present invention is to provide a data display/input method for a CNC apparatus, the method being designed so that the display of emergency information will not impede the operator at work using a display device but surely make the emergency information recognizable to the operator.

According to the data display/input method for CNC apparatuses of the present invention in a factory automation system provided with an online system connecting a host computer and the CNC apparatus to each other, the method comprises the steps of: transmitting display contents to be displayed at the CNC apparatus serving as a terminal equipment of the online system and input/output information associated with such display contents, from the host computer to the CNC apparatus; displaying the transmitted display contents at a display/input device of the CNC apparatus in accordance with the input/output information; and displaying the data manually input to the CNC apparatus and the display contents on the same screen of the display/input device. The data manually input to the CNC apparatus is transmitted to the host computer after being displayed at the display/input device. With this arrangement, both the display contents transmitted from the host computer and the data input to the CNC apparatus are displayed on the display/input device of the CNC apparatus. Consequently, the personal computer as relaying means becomes unnecessary, thereby not only reducing the cost of constructing the system but also enabling economical use of the floor space of the factory.

The input/output information transmitted from the host computer includes information of an on-screen display area, information of a display position, information of colors to be displayed, information of screen control, a display position of data manually input to the CNC apparatus, a format of the manually input data etc., so that, only by changing the setting of the host computer side, all CNC apparatuses connected to the host computer can perform data input/output processing in accordance with the changed setting, and the host computer can transmit information freely to the CNC apparatus side. Also, even in the case where data to be transmitted from the host computer to the CNC apparatuses is changed, it is not necessary to modify the data format of the individual CNC apparatuses, thereby facilitating system change. For the data manually input to the CNC apparatuses, the CNC apparatuses themselves carry out data setting in accordance with the format supplied from the host computer; therefore, the process, wherein a character code or the like to be input with every operation of the ten key is transmitted to the host computer for processing and echoed back to be displayed on the display screen of the CNC apparatus, is not required, thereby alleviating the load on the host computer and also permitting smooth processing operation of the entire system.

The input/output information includes specifications of display contents and functions of function keys to be displayed on the screen of the display/input device of the CNC apparatus, and the display contents include character information or graphic information. The CNC apparatus decodes the specifications and the information and displays the same on the screen of the display/input device thereof, and the display contents can be transmitted from the host computer on a page-by-page basis, so that it is possible for the display pages to be freely selected on the CNC apparatus.

Further, the program, the current positions of the servomotors, etc., which are subjected to the control of the CNC apparatus, can be displayed on a full screen of the CNC apparatus by selectively switching the display of the data from the host computer and the display of the program, the current positions of the servomotors, etc. using the soft keys or the like.

Further, in the data display/input method for a CNC apparatus according to present invention, the program number currently recognized by the CNC apparatus, the current positions of servomotors connected to the CNC apparatus, information as the command from the CNC apparatus, cutting load information of the servomotors or spindle motors, alarm information and the data indicating at least two kinds of the current status of the CNC apparatus including the transmission time are simultaneously transmitted from the CNC apparatus to the host computer either upon request from the host computer or periodically, thereby making it possible for the CNC apparatuses to access the host computer, and for host computer to effectively collect information from the CNC apparatuses.

For the sampling and data transmission, there are a method in which the CNC apparatus monitors the status thereof at predetermined period and transmits the monitored information to the host computer at the same period and a method in which the CNC apparatus stores the monitored information corresponding to two or more of the predetermined periods for later collective transmission to be made in response to a request from the host computer.

Further, according to the present invention, display contents to be displayed on the display/input device of the CNC apparatus are created beforehand within the host computer, and the display contents are transmitted to the CNC apparatus. Display data transmitted from the host computer includes emergency information and a code for changing the color of the emergency information to be displayed on the screen of the display/input device of the CNC apparatus, and the CNC apparatus displays the display contents by using a display method varying depending on the status thereof. Thus, the operator's work using the display device not only will not be impeded by the display of emergency information but also the necessary emergency information can surely be made recognized by the operator. For example, when the CNC apparatus is in an important setting/operation mode, such as a data entry mode or a program editing mode, the emergency information is displayed in a corner of the display screen so that the emergency information will not disturb important display on the screen. On the other hand, when the setting or operation by the operator is not needed as during automatic operation and thus it is very likely that the operator is away from the CNC apparatus, the emergency information is displayed on the entire display screen, to thereby call the operator's attention.

BRIEF DESCRIPTION OF DRAWINGS

FIG. 5 is a conceptual diagram showing a display screen state of the CNC apparatus;

FIG. 6 is a conceptual diagram showing another display screen state of the CNC apparatus;

FIG. 7 is a conceptual diagram showing still another display screen state of the CNC apparatus;

FIG. 8 is a conceptual diagram showing still another display screen state of the CNC apparatus;

FIG. 9 is a conceptual diagram showing still another display screen state of the CNC apparatus;

FIG. 10 is a conceptual diagram showing still another display screen state of the CNC apparatus;

FIG. 11 is a conceptual diagram showing still another display screen state of the CNC apparatus;

FIG. 16 shows an example of an index file for storing the display position etc. of text data;

BEST MODE OF CARRYING OUT THE INVENTION

Figure 1:
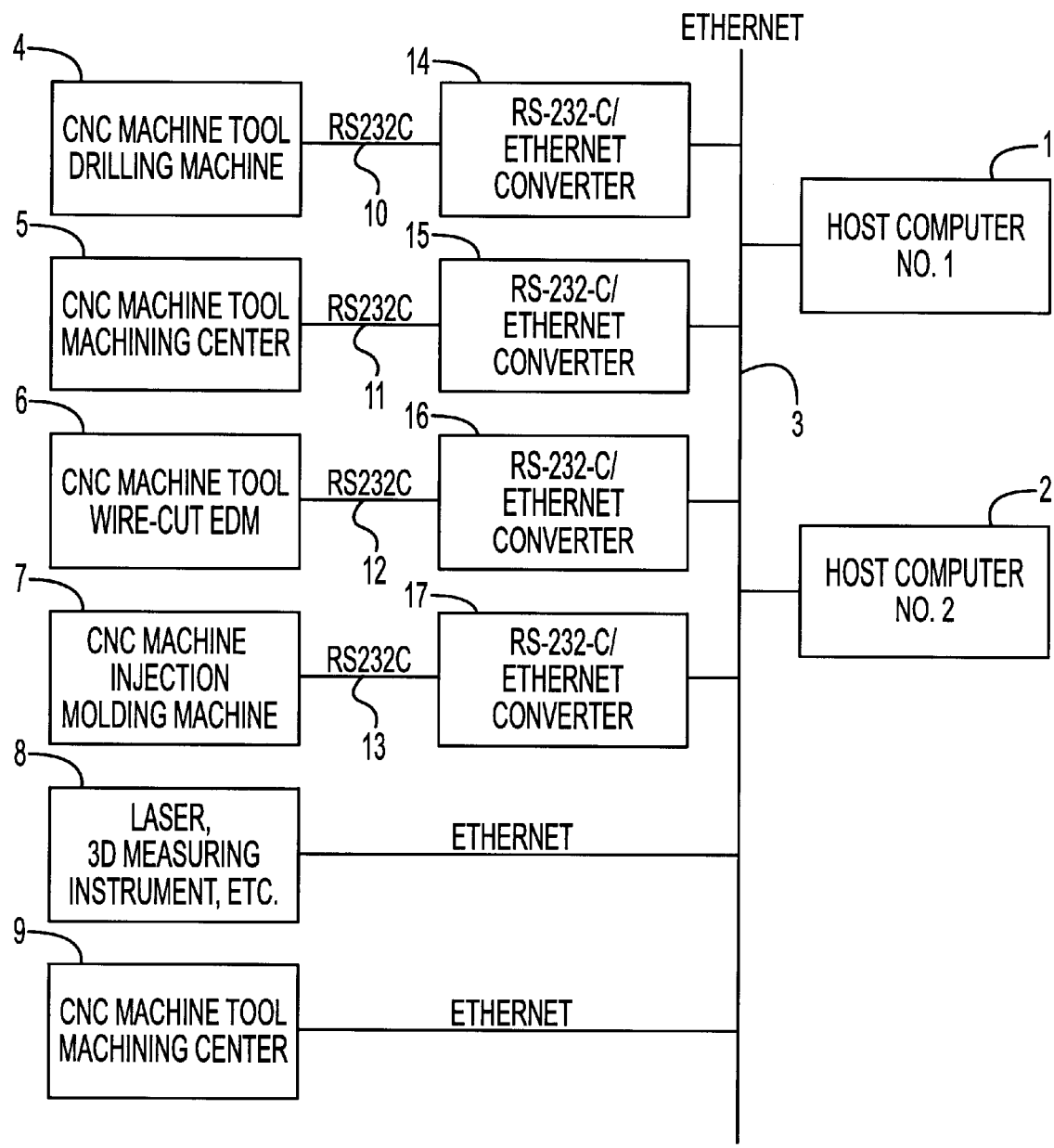
FIG. 1 is a conceptual block diagram illustrating an FA network system to which is applied an information processing method according to one embodiment of the present invention.

FIG. 1 is a conceptual diagram illustrating an example of an FA (Factory Automation) network system to which an information processing method according to the present invention is applied.

In this embodiment, a plurality of host computers, for example, first and second host computers 1 and 2, are interconnected via Ethernet 3 as a data transmission channel, and also CNCs (Computerized Numerical Controllers) 4 to 7 associated with a plurality of machine tools are connected to the Ethernet 3 via respective RS-232-C cables 10 to 13 and respective RS-232-C/Ethernet converters 14 to 17. The first and second host computers 1 and 2 are used for different purposes; for example, the first host computer 1 is a computer for production management while the second host computer 2 is a host computer for CAD/CAM.

The RS-232-C/Ethernet converters 14 to 17, each having a data transmission/reception function and a collision detection functions, serve as transceivers. A laser measuring instrument, or a three-dimensional measuring instrument 8, and a CNC apparatus 9, each being equipped with an Ethernet interface, can be connected directly to the Ethernet through their interfaces, so that RS-232-C/Ethernet converter is not required to be interposed therebetween. Many of CNC apparatuses are provided with an RS-232-C interface for the compatibility with conventional data input/output devices such as a tape reader and a floppy cassette, but some of laser measuring instruments and CNC apparatuses are equipped with built-in Ethernet interfaces from the beginning.

Each of the CNC apparatuses 4 to 7 and the measuring instrument 8 has a keyboard including numeric keys, character keys, cursor movement keys, etc. for manual data entry, and a display screen for the display of information, and drives and controls individual parts of an object of control, such as a drilling machine, a machining center, a wire electric discharge machine or an injection molding machine, by means of a CPU, ROM, RAM, etc. built therein.

Figure 2:
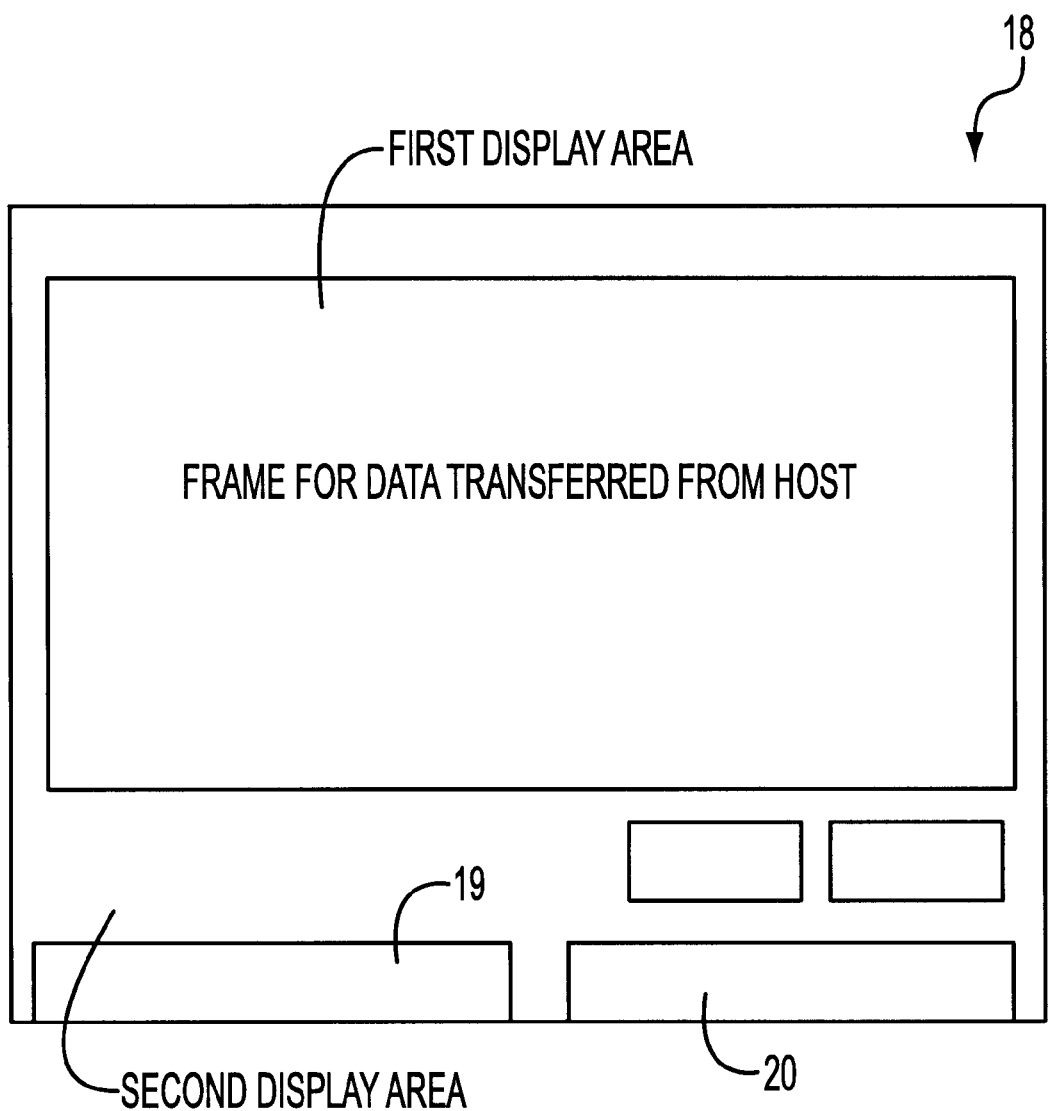
FIG. 2 is a conceptual diagram showing an example of how to split the display screen of a CNC apparatus.
Figure 3:
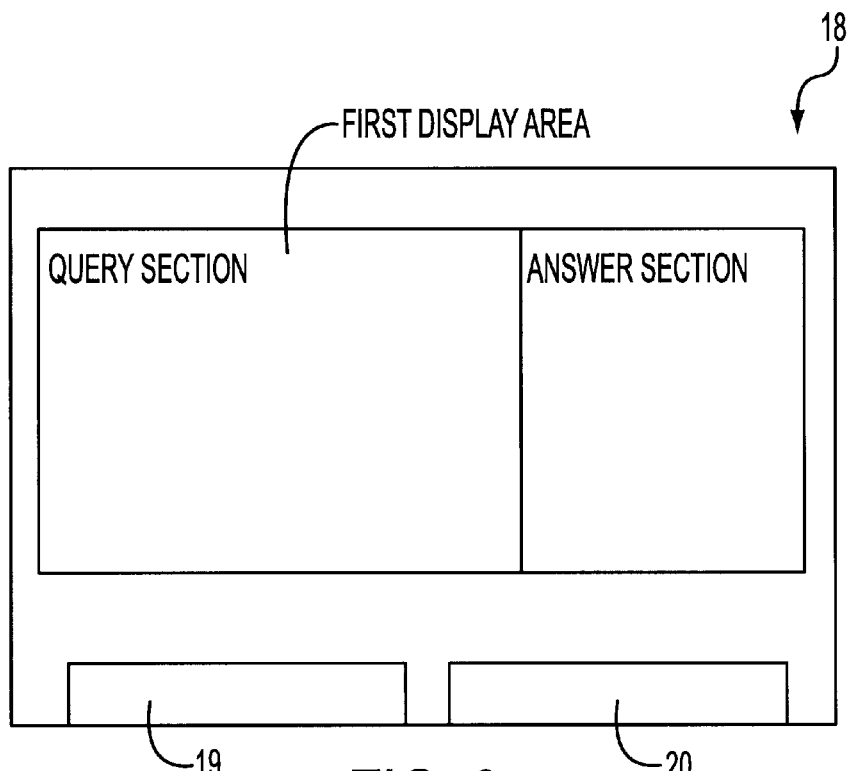
FIG. 3 is a conceptual diagram showing another example of how to split the display screen of the CNC apparatus.

FIGS. 2 and 3 are conceptual diagrams each showing an example of how to split the display screen 18 of each of the CNC apparatuses 4 to 7. In FIG. 2, the display screen is split into an upper half and a lower half so that the upper area or the first display area is assigned for the display of information from the first or second host computer 1, 2, while the lower area or the second display area is assigned for the display of a message from the CNC.

Figure 4:
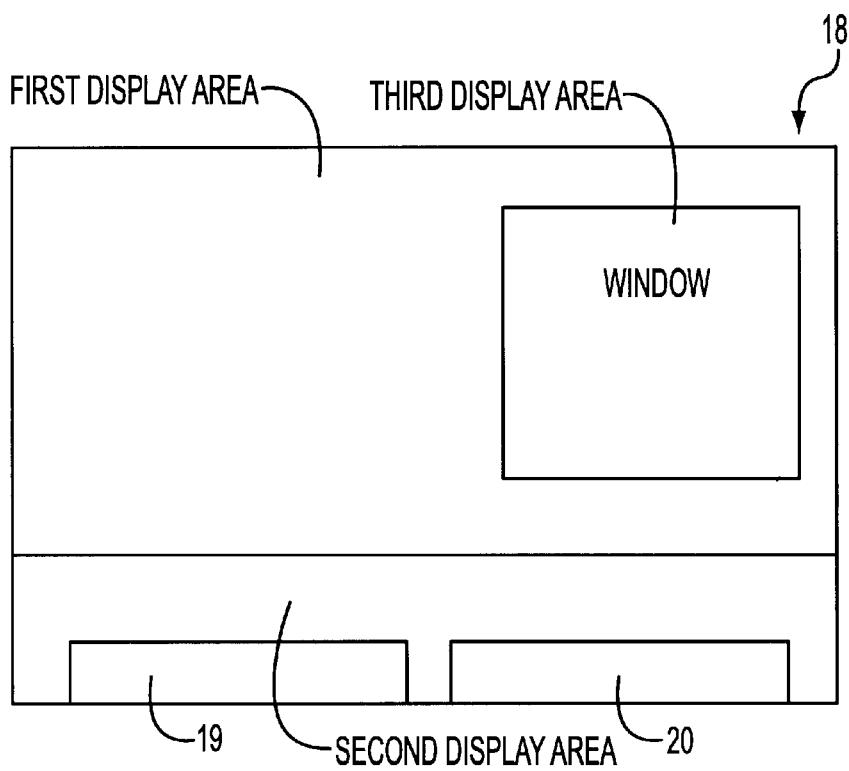
FIG. 4 is a conceptual diagram showing still another example of how to split the display screen of the CNC apparatus.

Also, as shown in FIGS. 3 and 4, the first display area is split into two sections, namely, a query section for displaying a query from the first or second host computer 1, 2, and an answer section.

Display information to be transferred from the first and second host computers 1 and 2 to the CNC apparatuses 4 to 7 includes information composed mainly of text data, such as those of a menu selection frame for selecting an item corresponding to a process to be executed, a file search frame for searching various guidance information, etc., information composed of graphic data, such as those various data preserved in the first and second-host computers 1 and 2, for example, a bar graph indicating the operation hours of the machine tools and the injection molding machine and sketch drawings of products for illustrating the procedure of product inspection, and information including both text data and graphic data in the form of one superposed upon the other.

A part of the operation procedures necessary for displaying the menu selection frame, the file search frame, the sketch drawings of products, etc. is stored as application programs in the first and second host computers 1 and 2. By starting these application programs in response to a request from the CNC apparatuses 4 to 7, the existing menu selection frame, sketch drawings of products, etc. can be transferred, or the storage devices in the first and second host computers 1 and 2 can be accessed, and after retrieving the required data, a bar graph etc. are generated following a predetermined procedure and then transferred to the CNC apparatuses 4 to 7.

Various pieces of information concerning the split of display screen for providing the first display area, the positioning of the display area, the number of colors for display, etc. (Hereinafter referred to as display attributes) are not uniform and vary depending on the type of data such as graphic data or text data, as well as on the application program used for the individual display operations, such as those for the menu selection screen, the file search frame, the sketch drawings of products, etc. The above display attributes are finally determined according to the individual application programs for display operation, and are stored in the first and second host computers 1 and 2 as index files etc. corresponding to the names or the like of the respective application programs. When display data such as those of the menu selection frame, the file search frame, the sketch drawings of products, etc. are transferred from the first or second host computer 1, 2 to any one of the CNC apparatuses 4 to 7, the display attributes, corresponding to the display data, are also transferred to the CNC apparatus together with the display data (the first/second host computer 1, 2 specifies the display attributes, which are then received by the CNC apparatus 4–7).

The display attributes include the numbers of columns and lines, the display position, fonts, etc. for text data, the display position, the number of colors to be displayed, the specifications of resolution and background color for graphic data, and use or no use of blinking, inverse video, etc. In the case where the number of colors, the number of intensity levels, etc. specified by the first or second host computer 1, 2 do not agree with the characteristics of any of the CNC apparatuses 4 to 7, display colors are determined through approximation by means of a color palette or the like of the CNC apparatus side. Instead of color display, gray scale or binary display may be employed.

FIG. 16 shows an example of an index file for storing, the display position etc. of data input from the CNC apparatus, one of the aforementioned display attributes. In this example, the positions of data (positions of the answer section) entered through key-in operation of the CNC apparatus in reply to a plurality of queries are determined by coordinates X (set column number) and Y (set line number) on the display screen 18, thereby determining the positions the initials of respective character strings are to be displayed, and also the entire length of each character string is determined by the input length (set value). Character strings per se such as ITEM 1, ITEM 2, . . . may be of any structure insofar as they fall within the range as determined by the input length. Further, a file for storing data entered with respect to each item is specified so that the corresponding input data may be stored in this file, and the data stored in this file is sent to the host computer.

The graphic data may be either raster graphics or vector graphics. In many cases, to reduce the size of a file of data to be transferred and to improve the on-screen resolution, commands to create objects such as circle, rectangle, straight line, etc. are transferred as data from the first and second host computers 1 and 2 to the individual CNC apparatuses 4 to 7, and the CNC apparatuses 4 to 7 themselves translate the commands to display the objects. Unlike the aforementioned case of message display, the display position in this case is of course not affected by the number of text-based columns or lines.

The text data sometimes compressed or decompressed when transferring.

Transfer of text data and graphic data in superposed form can be accomplished by, an ordinary processing, such as bit-mapping of the text data or operation of the resources of various data.

As shown in FIG. 4, when necessary, a third display area (hereinafter referred to as window) for showing various data can be made available in such a manner that the window is superposed on or separated from the first or second display area. The vertical and horizontal lengths and display position of the window are also a kind of display attributes determined in terms of the number of display dots on the display screen. Thus, when displaying the window, its display attributes are transferred, together with text data or graphic data to be displayed in the window, from the first or second host computer 1, 2 to a corresponding one of the CNC apparatuses 4 to 7. In the case where the dot pitch, inch-based screen size or the like of any of the CNC apparatuses 4 to 7 differs from those originally defined, the CNC apparatus makes the necessary correction for a proper display on the screen.

Basically, the window is used to display data transferred from the first or second host computer 1, 2; however, when suitable software is installed, the window screen can be controlled through input operation of the CNC apparatuses 4–7. It is to be noted that the way of using the window is not limited in various other embodiments of the invention.

In FIGS. 2 to 4, reference numeral 19 denotes a first function key display area and 20 denotes a second function key display area. Display attributes relating to the first function key display area 19 are stored as part of the display attributes of the aforementioned first display area, and display attributes relating to the second function key display area 20 are stored in each of the CNC apparatuses 4 to 7. Each of the first and second function key display areas 19 and 20 shows a key screen divided horizontally into five parts, as shown in FIGS. 5 through 13, and ten switches in total are arranged below the display device of each of the CNC apparatuses 4 to 7, corresponding in position to the respective divided parts.

As seen from FIGS. 5 through 13, the key assignment of the first-function-key display area 19 varies depending on the state of the display screen, that is, depending on the application program of the first or second host computer 1 or 2, which controls the screen display, while the key assignment of the-second-function key display area 20 remains unchanged regardless of the display on the screen and the keys are always function only as switches for DISCONNECT LINE and END functions. In other words, those function keys displayed in the display area 19 function, as de facto terminals of the individual CNC apparatuses 4 to 7, when the operator accesses the first or second host computer 1, 2, while those function keys displayed in the display area 20 function as function keys for enabling the operators to execute the functions of the respective CNC apparatuses 4 to 7, such as line connection with the first or second host computer 1, 2, etc. The individual display contents etc. on the screens will be described later.

Figure 22:
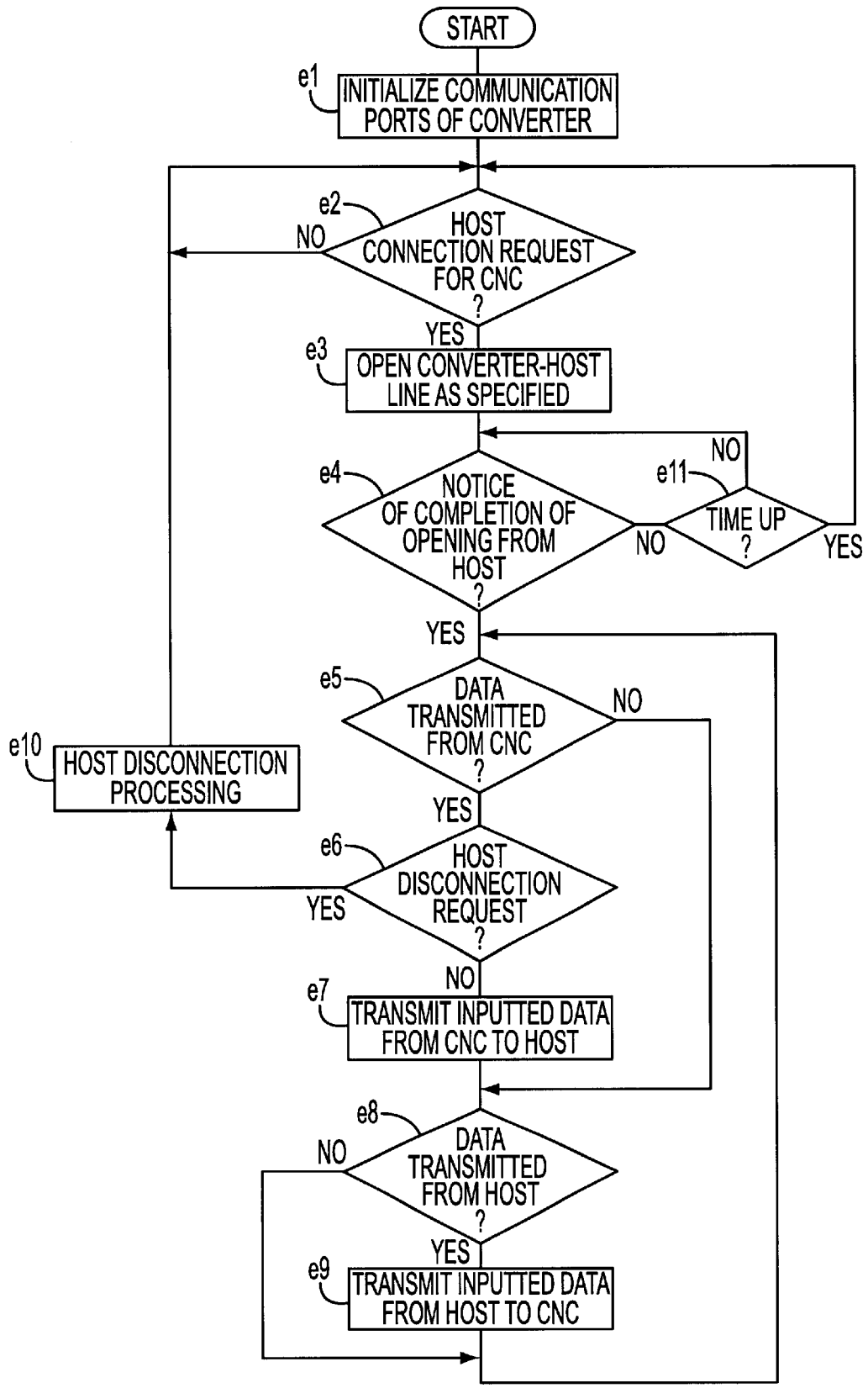
FIG. 22 is a flowchart schematically showing a processing to be executed by an RS-232-C/Ethernet converter.
Figure 23:
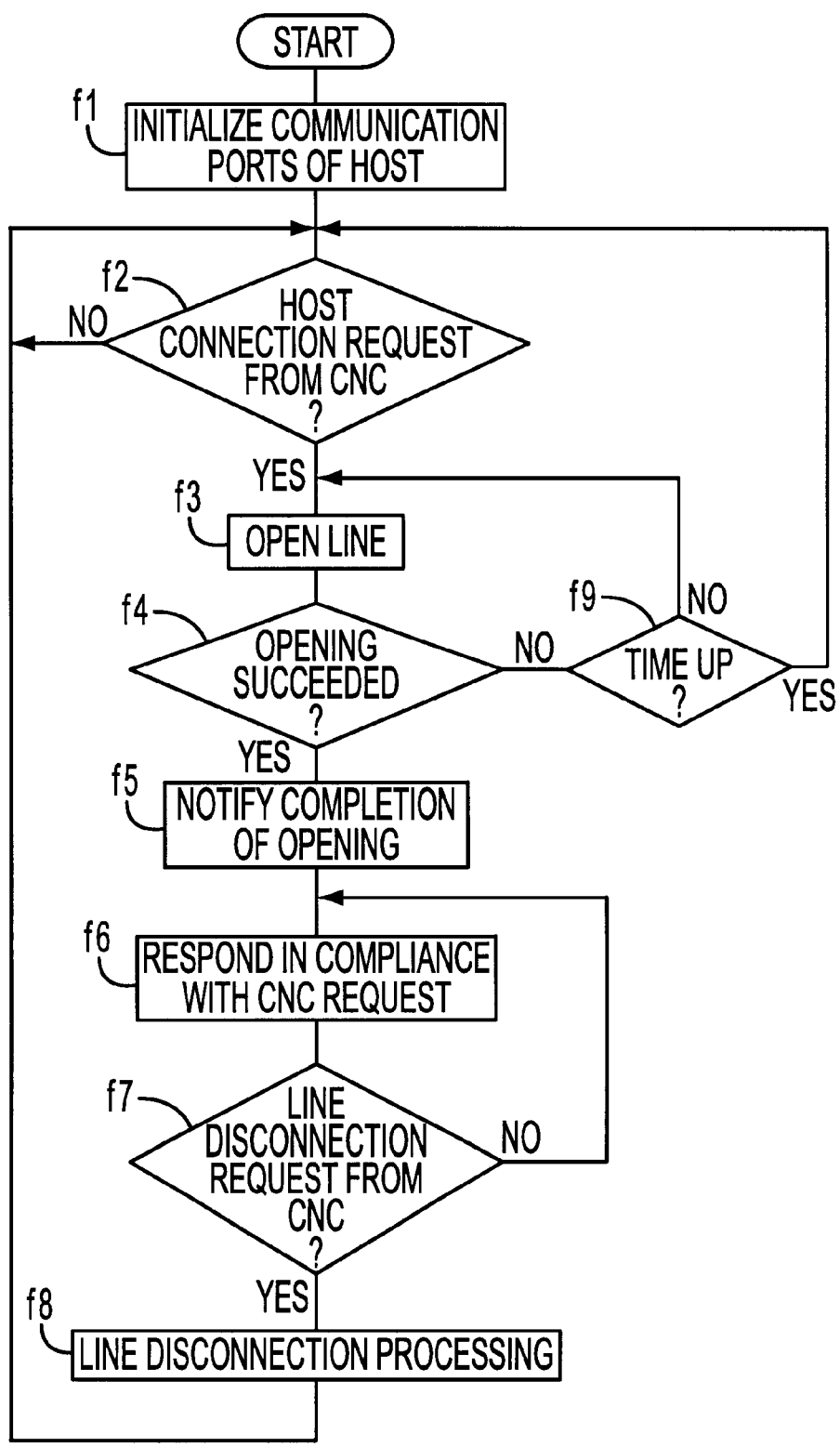
FIG. 23 is a flowchart schematically showing an information input/output processing to be executed by the host computer.
Figure 24:
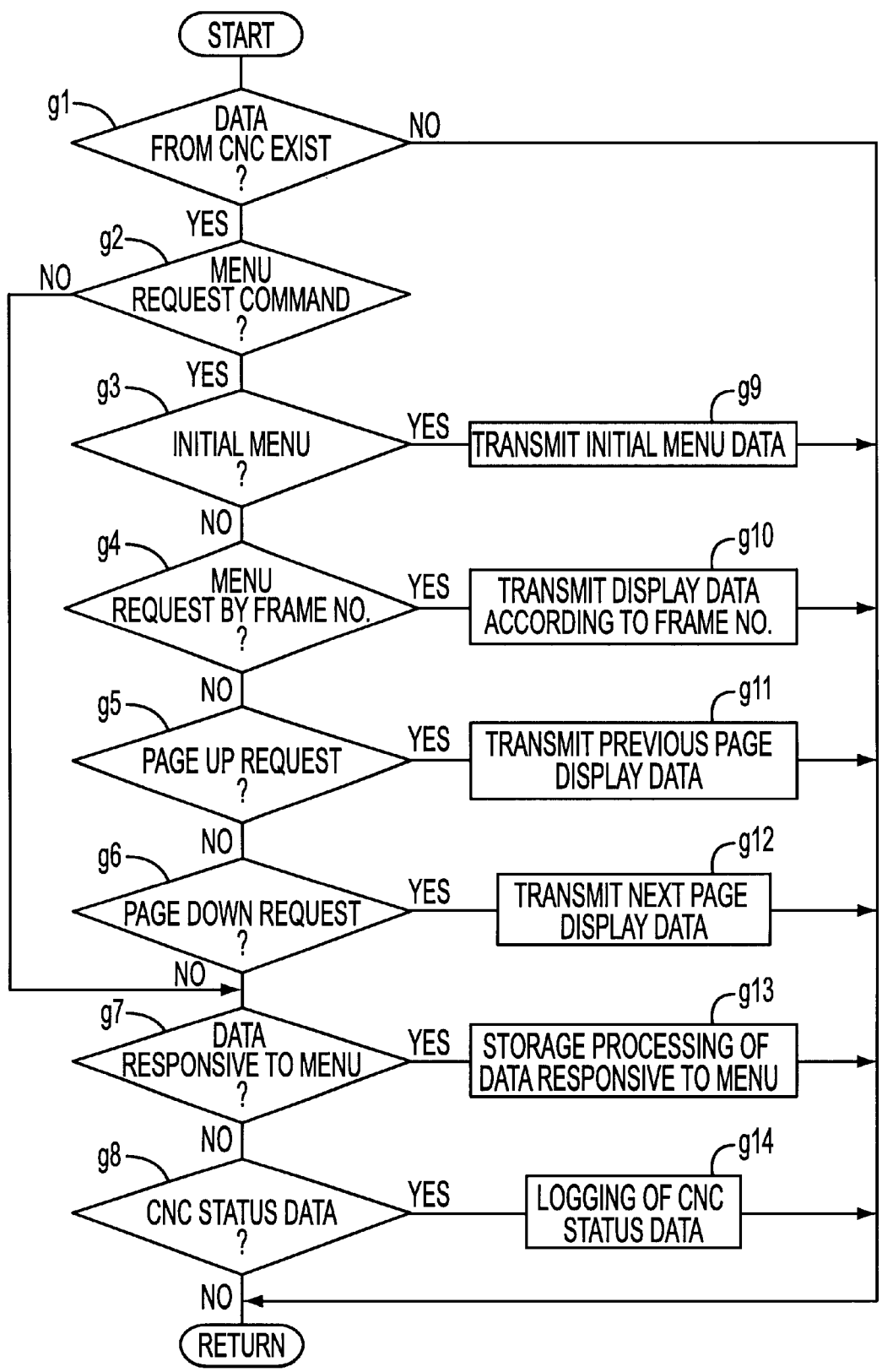
FIG. 24 shows the continuation of the flowchart schematically showing the information input/output processing to be executed by the host computer.

FIGS. 17 through 21 are flowcharts schematically illustrating an information input/output processing etc. executed by each of the CNC apparatuses 4 to 7; FIG. 22 is a flowchart schematically illustrating a processing executed by each of the RS-232-C/Ethernet converters 14 to 17; and FIGS. 23 and 24 are flowcharts schematically illustrating an information input/output processing executed on the part of the first and second host computers 1 and 2.

Figure 17:
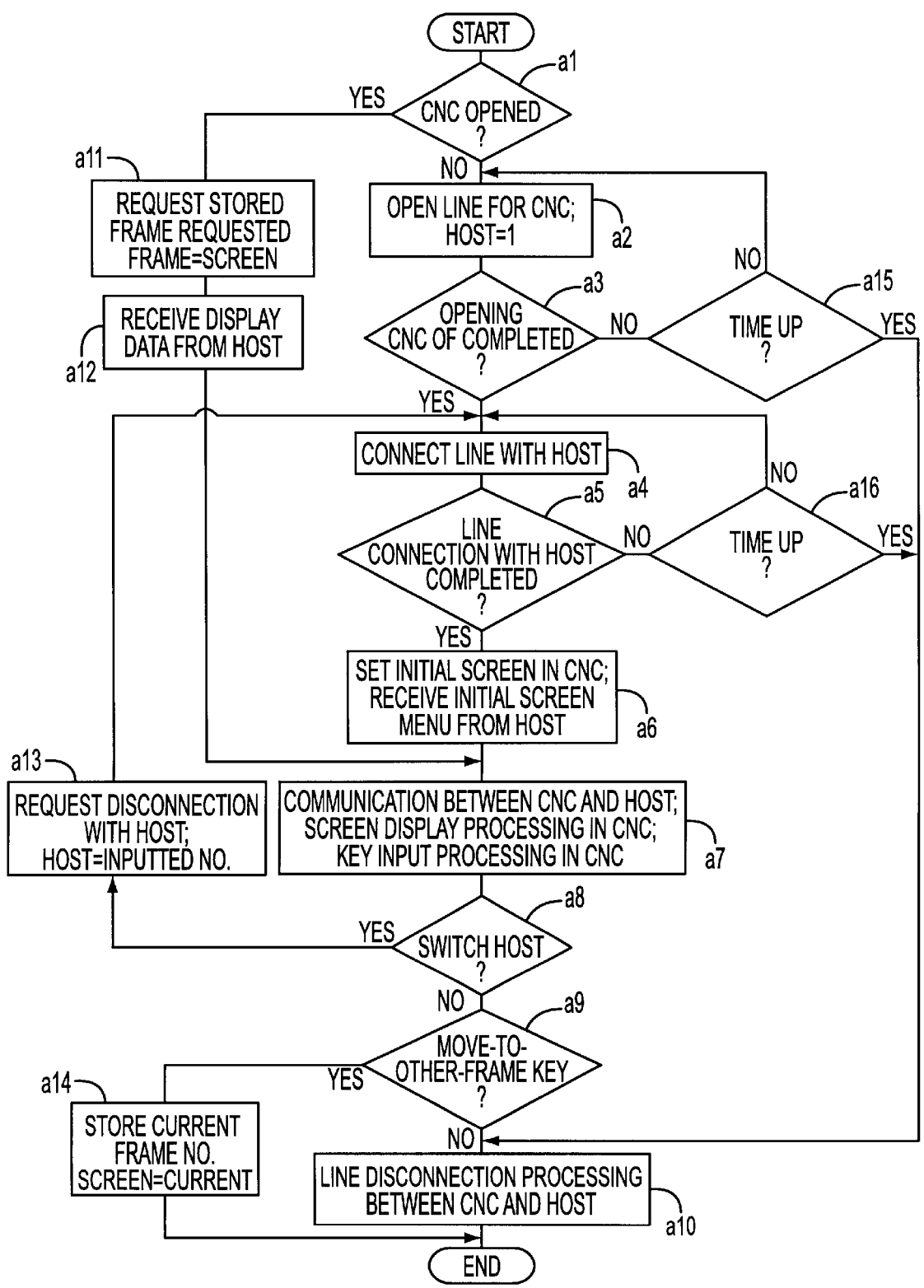
FIG. 17 is a flowchart schematically showing an information input/output processing to be executed by the CNC apparatus.
Figure 18:
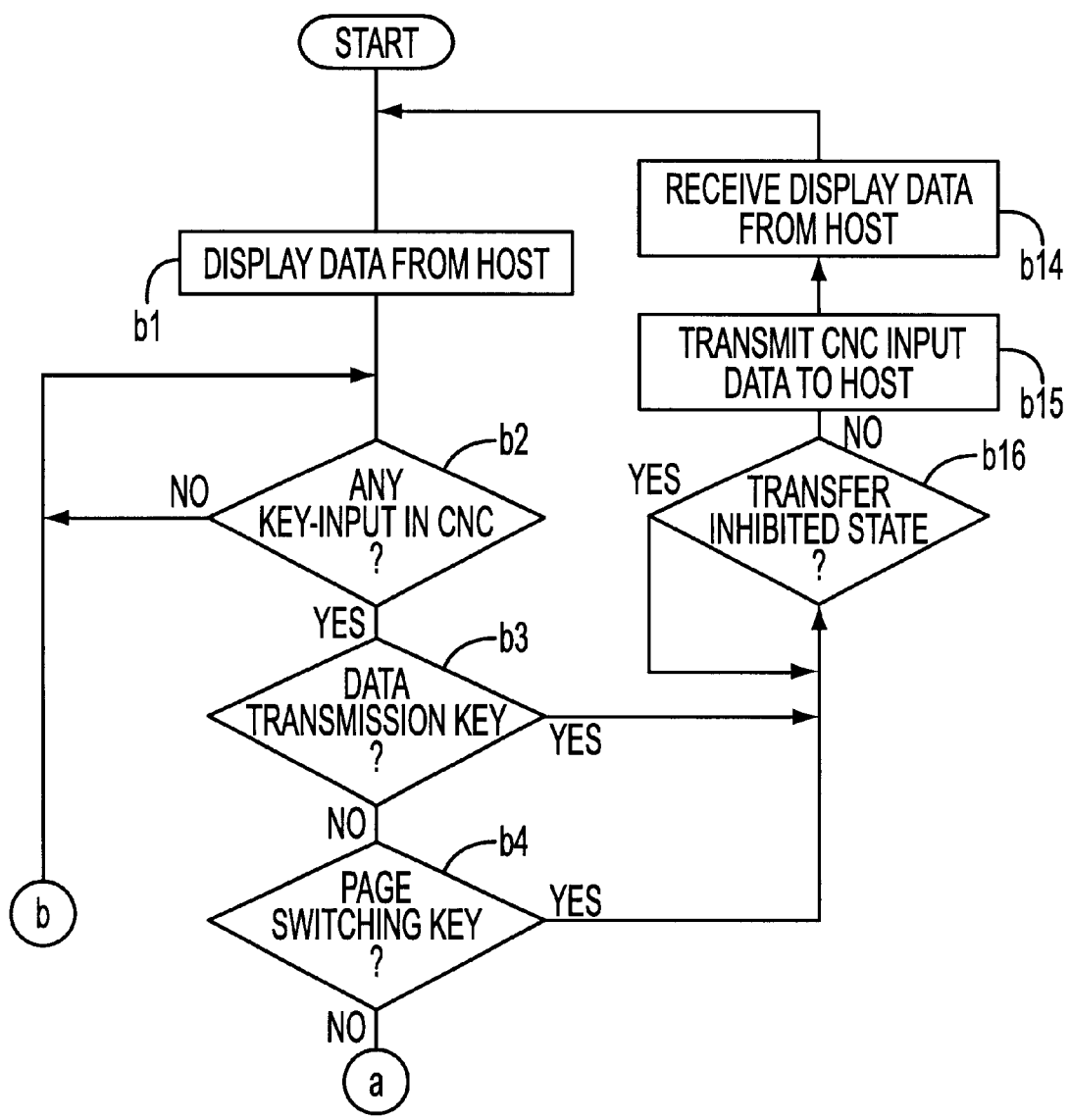
FIG. 18 is a flowchart showing in detail part of the information input/output processing to be executed by the CNC apparatus.
Figure 19:
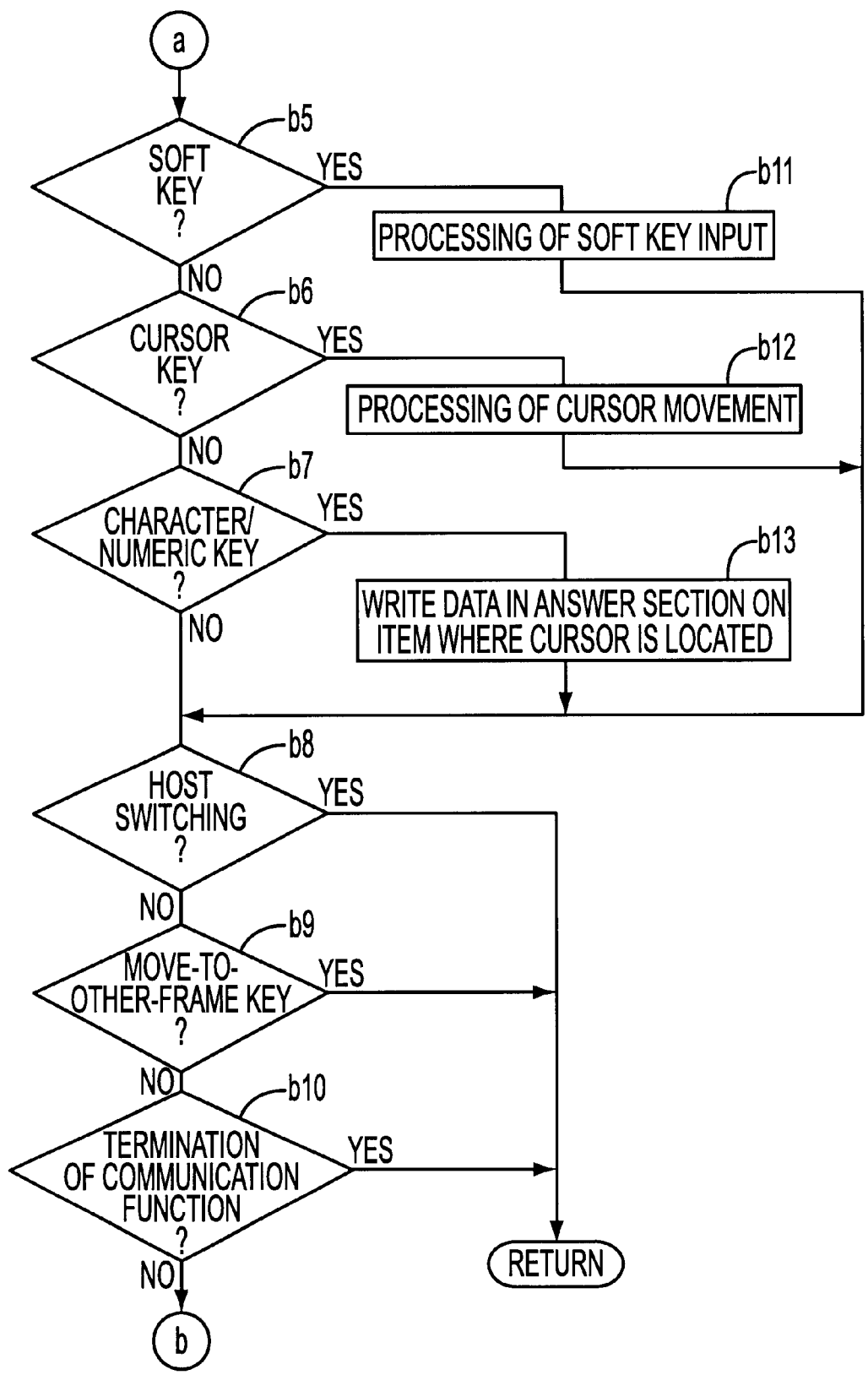
FIG. 19 is a flowchart showing in detail another part of the information input/output processing to be executed by the CNC apparatus.
Figure 20:
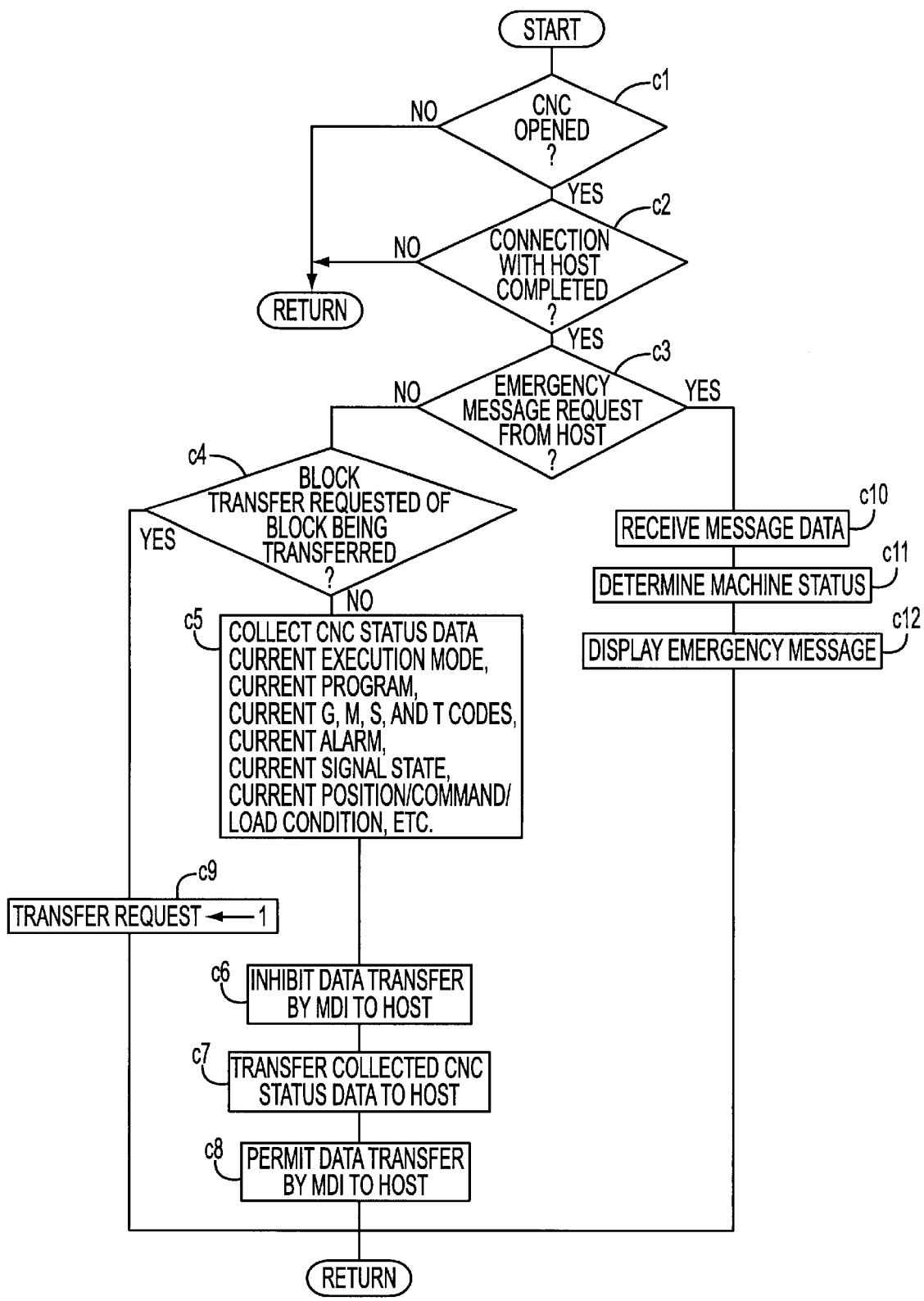
FIG. 20 is a flowchart schematically showing an information transfer processing to be executed by the CNC apparatus.

Among these processings, the information input/output processing shown in FIGS. 17 to 19 is executed by the CPU of each of the CNC apparatuses 4 to 7 upon input of a communication-dedicated screen display command thereto, and the information input/output processing shown in FIG. 20 is repeatedly executed by the CPU of each of the CNC apparatuses 4 to 7 at each predetermined period (e.g., 30 seconds). The processing shown in FIG. 22 is constantly and continuously executed by the CPU assigned to each of the RS-232-C/Ethernet converters 14 to 17, and the information input/output processing shown in FIG. 23 is constantly and continuously executed by the CPU of each of the first and second host computers 1 and 2.

Referring to these flowcharts, the processing operation according to this embodiment will be now explained. Devices of an identical type, namely, the CNC apparatuses 4 to 7, the RS-232-C/Ethernet converters 14 to 17, and the first and second host computers 1 and 2, carry out substantially the same processing, so that, in the following description, such devices are not individually referred to by specific reference numerals (such as the CNC apparatus 4, the CNC apparatus 5, etc.).

On starting the information input/output processing in response to the operation of a communication-dedicated frame display request key, the CNC apparatus first determines whether or not the connection of a communication line between this CNC apparatus and the RS-232C/Ethernet converter associated therewith is established (Step a1 in FIG. 17). At this stage, the RS-232-C/Ethernet converter of this CNC apparatus has already completed initialization of its ports (Step e1 in FIG. 22; operation performed immediately after power supply is started) and thus is in a standby state for reception of a host connection request signal from the CNC apparatus (Step e2); however, at this point of time, no host connection request signal has been output from the CNC apparatus to the RS-232-C/Ethernet converter. Thus, the communication line between the RS-232-C/Ethernet converter and the CNC apparatus is in a shutoff state (disconnected state), and thus connection between the CNC apparatus and the host computer is not established yet. Consequently, the result of determination in Step a1 of FIG. 17 is in this case inevitably No.

The CNC apparatus then memorizes the first host computer 1 as the first target of connection and outputs a host connection request signal to the RS-232-C/Ethernet converter (Step a2). Subsequently, it is determined whether or not the line connection between the CNC apparatus and the RS-232-C/Ethernet converter is established (Step a3), and, if not, a retrial operation for establishing the line connection is repeatedly executed until the line connection is established or a predetermined allowable time expires (Step a15).

The determination processing in Step a15 is an error avoidance processing in order to prevent the entire processing operation of the CNC apparatus from being impeded by a partial fault, such as line abnormality or the like. Normally, the line connection between the CNC apparatus and the RS-232-C/Ethernet converter is established within the time limit as defined by the above predetermined allowable time. If, however, the determination in Step a15 turns out to be Yes because of an erroneous cable connection or the like, a line disconnection processing is performed to terminate the retrial operation for line connection (Step a10), thereby preventing the overall function of the CNC apparatus, for example, the general operation control function for the machine tool, from being stopped.

After the line connection between the CNC apparatus and the RS-232-C/Ethernet converter is established, the CNC apparatus outputs to the RS-232-C/Ethernet converter a command to establish line connection with the host computer which is the target of connection, as well as an initial menu selection frame request signal (Step a4), and enters into a standby state for reception of a connection completion signal to be input from the host computer being the target of connection (Step a5, Step a16). The target of connection set in this stage is the first host computer 1 as already mentioned, and the initial menu selection frame request signal output from the CNC apparatus to the RS-232-C/Ethernet converter in Step a4 is temporarily stored in the RS-232-C/Ethernet converter.

On detecting the line connection command in Step e2 of FIG. 22, the RS-232-C/Ethernet converter selects the first host computer 1 as the target of connection, in accordance with the setting in the aforementioned Step a2, initiates a line connection between the RS-232-C/Ethernet converter and the host computer (Step e3), and repeatedly executes a retrial operation for establishing the line connection until a connection completion signal is input from the host computer (Step e4) or a predetermined allowable time elapses (Step e11). If no connection completion signal is input from the host computer within the predetermined allowable time, it means that the lines of the host computer side are occupied for the data transmission processing with respect to other CNC apparatuses. In such a case, the RS-232-C/Ethernet converter suspends the retrial operation for establishing the line connection and proceeds to Step e2 again, wherein it enters into a standby state for reception of the host connection request signal to be input from the CNC apparatus.

On the other hand, the host computer, which has already completed initialization of its communication ports in Step f1 of FIG. 23 (operation performed immediately after power supply is started) and thus currently is in a standby state for reception of a line connection request from the RS-232-C/Ethernet converter, detects the line connection request (see Step e3) from the RS-232-C/Ethernet converter in Step f2, initiates a line connection with the RS-232-C/Ethernet converter (Step f3), and repeatedly executes retrial operation for establishing the line connection until the line connection is made successfully (Step f4) or until a predetermined allowable time expires (Step f9). If the connection with the RS-232-C/Ethernet converter continuously fails during the predetermined allowable time, the host computer suspends the retrial operation and proceeds to Step f2 again, wherein it enters into a standby state for reception of the connection request signal to be input again from the RS-232-C/Ethernet converter.

When the line connection of the host computer is made successfully, the host computer outputs a connection completion signal to the RS-232-C/Ethernet converter (Step f5). This connection completion signal is sent also to the CNC apparatus via the RS-232-C/Ethernet converter and is detected in Step a5 to be executed by the CNC apparatus.

That is, mutual communication channel is established for the host computer, the target of connection, when execution of Step f5 has been completed, for the RS-232-C/Ethernet converter when the determination in Step e4 is Yes, and for the CNC apparatus when the determination in Step a5 is Yes.

After detecting the connection completion signal from the host computer in Step e4 of FIG. 22, the RS-232-C/Ethernet converter determines whether or not there is any data to be transmitted from the CNC apparatus to the host computer (Step e5). In this case, since the initial menu selection data display request signal output from the CNC apparatus in Step a4 is stored in the RS-232-C/Ethernet converter, the determination in Step e5 is Yes, and the RS-232-C/Ethernet converter then determines whether or not this data is transmitted is a line disconnection request to the host computer (Step e6). The initial menu selection data display request signal is of course not a line disconnection request; therefore, the determination in Step e6 is No, and the RS-232-C/Ethernet converter transfers the data from the CNC apparatus, that is, the initial menu selection frame request signal, to the host computer (Step e7).

In step f6 in FIG. 23, upon detection of data input from the CNC apparatus via the RS-232-C/Ethernet converter, the host computer collectively executes all the processings in compliance with a request specified in the input data. During the period of time, after completion of the execution of Step f5 until a line disconnection request is input from the CNC apparatus (Step f7), that is, during the period from the connection to the subsequent disconnection of the line between the host computer and the CNC apparatus, the host computer repeatedly executes Step f6, details of which are shown in FIG. 24, and Step f7 in compliance with the request from the CNC apparatus.

Immediately after starting the processing of Step f6, the host computer first determines whether or not data from the CNC apparatus has been input (Step g1 in FIG. 24), and, if there is no input data, repeatedly executes only Steps g1 and f7 thereafter, waiting for data to be input from the CNC apparatus. Upon detecting data input from the CNC apparatus, the host computer identifies a request from the CNC apparatus by executing the succeeding Steps g2 through g8, starts a required program from among the aforementioned various application programs in compliance with the request, and executes the necessary operation in Steps g9 to g14.

In this case, the initial menu selection frame request signal from the CNC apparatus has been input, and thus the determination in Steps g1 to g3 is Yes; therefore, the host computer reads a first initial menu display frame as shown in FIG. 5 from its storage device, and outputs the menu data to the RS-232-C/Ethernet converter of the CNC apparatus which requested the data (Step g9). As previously mentioned, the data transferred in this case includes the numbers of columns and lines, display position, font, etc. of text data, the display position, number of display colors, and specifications of resolution and background color for graphic data, the use/nonuse of blinking and inverse video, the assignment of function keys in the first function key display area 19, etc.

The first initial menu selection frame shown in FIG. 5 is a job selection frame which permits the operator of the CNC apparatus to utilize the host computer for selecting a job to be performed. With this frame displayed in the first display area on the display screen of the CNC apparatus, the operator selects an item number corresponding to a desired job by operating the keyboard etc. of the CNC apparatus, whereupon the selected item number is shown at position A01 (area for showing an input operation performed with respect to the CNC apparatus), which belongs to the second display area, and, if an execute key in the first function key display area 19 is then operated, the value of the thus-set item number is transmitted to the host computer via the RS-232-C/Ethernet converter, as described in detail later.

Thus, for a job requiring transmission of data from the CNC apparatus in response to data transferred from the host computer to the CNC apparatus, even after the data transfer processing such as one in Step g9 is completed, the event of the corresponding application program continues to be active, and the processing of the host computer remains under the control of this application program until responsive data is received from the CNC apparatus. Thus, although it looks as if Step g7 is the only step for detecting responsive data sent from the CNC apparatus, it is possible to determine which application program of the host computer corresponds to the responsive data from the CNC apparatus is associated. Data from the CNC apparatus side is detected also in Step g1, but Step g1 is provided to detect all the data transferred from the CNC apparatus and thus differs from Step g7 in which only responsive data is detected.

After transferring the data to the CNC apparatus, the host computer waits for reception of responsive data from the corresponding CNC apparatus while repeatedly making determinations in Steps g1 and f7, and then reads the responsive data in Step g7.

In this embodiment, various selection or setting frame shown in FIGS. 6 through 9 are called in hierarchical order via the route of the initial menu selection frame shown in FIG. 5; accordingly, in order for the operator of the CNC apparatus to carry out a job by using the first or second host computer 1, 2, first it is necessary that the first initial menu selection frame shown in FIG. 5 should be displayed on the CNC apparatus. To this end, when accessing the host computer for the first time after power supply is started, it is designed that the CNC apparatus always sets the first host computer 1 as the target of connection, and then outputs the request for connection with the first host computer 1 and the initial menu selection frame request signal (see Step a2 in FIG. 17).

On the other hand, after making the data from the CNC apparatus being transferred to the host computer by the processing in Step e7 of FIG. 22 and making the temporarily stored data being cleared, the RS-232-C/Ethernet converter waits for data to be transferred from the host computer while repeatedly executing the processings in Steps e8 and e5; on detecting data sent from the host computer in Step e8, the RS-232-C/Ethernet converter immediately transfers the received data to the CNC apparatus (Step e9).

On the part of the CNC apparatus, the data transferred from the RS-232-C/Ethernet converter is detected and stored in Step a6 of FIG. 17, and then a specific cooperative operation with the host computer is started as the operator manipulates the keyboard or the like (Step a7). Like the aforementioned processing of the host computer in Step f6, the processing of Step a7 is continuously executed until the operator operates a host switching key of the CNC apparatus, and during execution of this processing, the CNC apparatus and the host computer maintain a handshaking state. Details of Step a7 are shown in FIGS. 18 and 19.

After reading the data transferred from the RS-232-C/Ethernet converter, the CNC apparatus first displays the first initial menu selection frame shown in FIG. 5 and changes the assignment of function keys in the first function key display area 19 (Step b1) in accordance with the display attributes contained in the transferred data, namely, the numbers of columns and lines, display position, font, etc. of text data, the display position, number of display colors, and specifications of resolution and background color for graphic data, the use/nonuse of blinking and inverse video, the assignment of function keys in the first function key display area 19, etc; subsequently whether or not the Key-in operation by the operator has been made is determined by the CNC apparatus (Step b2), and if no key-in operation is detected, the CNC apparatus waits thereafter until a key-in operation is detected.

When an input by of a function key or of the keyboard is detected, the CNC apparatus first determines whether or not this key-in operation relates to data transmission (Step b3). The key-in operation relating to data transmission is, for example, an operation of the execute key on the aforementioned first initial menu selection frame shown in FIG. 5.

If the detected key-in operation has no relation to data transmission, the CNC apparatus determines whether or not the key-in operation has relation to page switching (Step b4). In the case of the first initial menu selection frame shown in FIG. 5, information to be displayed fits in one screen, and therefore, a function key for page switching is not displayed. However, in the cases where information to be displayed at an identical hierarchical level extends over two or more frames, as in the setting screen for appearance inspection and inspection of important parts shown in FIG. 6, page switching keys, for example, a next item key and a previous item key shown in FIG. 6, are displayed so that the operator can operate these keys to have information on the required item displayed on the display screen of the CNC apparatus.

In this embodiment, in order to save the memory space of the CNC apparatus side, when pages have to be switched, the memory of the CNC apparatus is once cleared, and the CNC apparatus again accesses the host computer to retrieve information for another display on the screen. In this case, the memory is not cleared in its entirety, and, thus, for example, the data set by key-in operation etc. with respect to the previously selected display on the screen is retained. Therefore, when setting operation has to be carried out over multiple screens for the data of an identical hierarchical level, the data set with respect to the previous screen need not be transferred before the screens are switched. For example, when the data covers two pages, page 1 and page 2, it is not necessary that the data set on page 1 be transferred before reading the display information of page 2; the display information of page 2 can be read immediately after setting the data on page 1, and thus, it is also possible that, after the necessary data is set on page 2 with reference to the displayed information, the data set with respect to pages 1 and 2 be collectively transferred.

In those cases where it is difficult to store multiple pieces of data to be displayed covering a plurality of screens, set data corresponding to one screen may be transferred by operating the page switching key.

Transfer data setting by the operator should have been completed before key-in operation relating to data transmission is made. Both the key-in operation relating to data transmission and the key-in operation relating to page switching can be made by operating a single key; therefore, when these keys are operated, the contents of data may immediately be transferred from the CNC apparatus to the host computer.

Thus, when key-in operation relating to data transmission or key-in operation relating to page switching is made, the CNC apparatus first determines whether or not it is in a transfer inhibiting state (Step b16). If not in the transfer inhibiting state, CNC apparatus transfers the data immediately to the host computer via the RS-232-C/Ethernet converter associated therewith (Step b15), causing the host computer to perform the processing of the aforementioned Step f6 shown in FIG. 23, that is, the processing shown in FIG. 24, to receive new information from the host computer (Step b14), and makes the information from the host computer to be displayed on the display screen thereof in accordance with the received display attributes (Step b1), in the same manner as described above. For example, with the first initial menu selection frame as shown in FIG. 5 is displayed on the CNC apparatus, if "1" is entered in the region of A01 through ten key and then the execute key is operated, information relating to instruction/setting for testing and checking, shown in FIG. 6, is sent from the host computer. In FIG. 6, page number 6 is given; however, the information on page 1 will be received first.

More specifically, to retrieve the first page of the information relating to the instruction/setting for testing and checking, the display frame number "1" corresponding to appearance inspection and inspection of important parts is entered in region A01 on the first initial menu selection frame of FIG. 5 through the ten key, and then the execute key is operated, whereupon the host computer executes the processings of Steps g4 and g1 shown in FIG. 24, to receive the display information relating to the appearance inspection and inspection of important parts for display on the screen of the CNC apparatus; then, the next item key, one of the page switching keys, is operated a plurality of times, causing the host computer to repeatedly execute the processings of Steps g6 and g12 in FIG. 24, and thereby receiving the information on page 6 relating to the appearance inspection and inspection of important parts. Needless to say, to return to display of the previous page, the previous item key, one of the page switching keys of the CNC apparatus, is operated, whereupon the host computer executes the processings of Steps g5 and g11 shown in FIG. 24, and the CNC apparatus displays the information on previous page.

At this stage, since the host computer and the CNC apparatus are already in a handshaking state and thus linked, it is not necessary to confirm the connection in executing Step b15 or b14. The transfer inhibiting state is checked in Step b16, because information transferred from the CNC apparatus to the host computer includes items of information that are more important than page switching data and menu selection data, such as internal information of the CNC apparatus including machine tool operation data, etc. Thus, while the machine tool operation data is being transferred as described in detail later, the processing for transferring data of lower priority, such as page switching data, menu selection data, etc., is canceled and such low-priority data cannot be transferred even if the execute key or the like is operated. During such a period, therefore, operations of various input keys are not accepted either.

As described previously, in this embodiment, various items of display information are treated hierarchically, and, the first initial menu selection frame as shown in FIG. 5 is a root of the hierarchy and is followed by submenu frames such as the setting frames for the appearance inspection and inspection of important parts as shown in FIG. 6, a file search frame as shown in FIG. 7, and not-in-stock information search frame as shown in FIG. 9. Below the submenu comes another hierarchical level; for example, an alarm reference frame shown in FIG. 8 comes below the file search screen of FIG. 7. Among the various frames to be displayed on the CNC apparatus, the setting frames at the lowest hierarchical level are in many cases used directly for actual data setting operation, and any of such frames can be called as needed by may of the frame ranking immediately above the frame concerned and serving as an index.

Of these various display frames, one shown in FIG. 7 is a retrieving frame used to ascertain details of alarms, assembling information, parts information, detailed explanation of manipulations, etc. For instance, when one of the frame numbers "1" to "4" is selected and input, detailed data on alarms, assembling information, parts information or manipulations is sent from the host computer and displayed on the display screen of the CNC apparatus. In other words, this frame provides information to serve as substitutes for operation manuals or the like, and by rewriting the original data on the host computer side, it becomes possible to provide a large number of CNC apparatuses with the latest information at all times, such information being advantageous over a hard copy of specification sheets in respect of promptness, ease of data updating, etc. Furthermore, not only drawings for manufacture, etc. are in general subject to revision but also, in these days, design work is computerized, so that the electronic data (drawings) stored in a CAD/CAM system are the latest data. Thus, the data in the CAD/CAM system can directly be transferred on line to the CNC apparatuses, this being advantageous in that the delay of the application of revised data due to a delay in supplying the latest information can be prevented. A similar advantage can be obtained also in the case where this system is applied to an on-line manual. In some systems known in the art, when the original data is modified, other copies of data created based on the model of the original data are modified accordingly. Compared with such systems, this embodiment is more useful in that it does not require complicated modification procedure involving the software. For example, when the frame number "1" corresponding to alarm item in the frame of FIG. 7 is selected and input, the frame shown in FIG. 8 is displayed to permit the entry of information about alarms, and, by inputting the number of alarm to be referred to in region A01, it is possible to learn the nature of abnormality corresponding to the alarm number. If more detailed information is needed, it is necessary only to input symbol "Y" for more detailed information in position A02.

FIG. 9 shows a frame for retrieval of not-in-stock parts information, a frame to be displayed when the screen number "14" is selected by the initial menu selection frame shown in FIG. 5; like the above case of FIG. 8, when the number the part to be referred to is input in region A01, detailed information on the part specified by the part number is transferred from the host computer.

Figure 25:
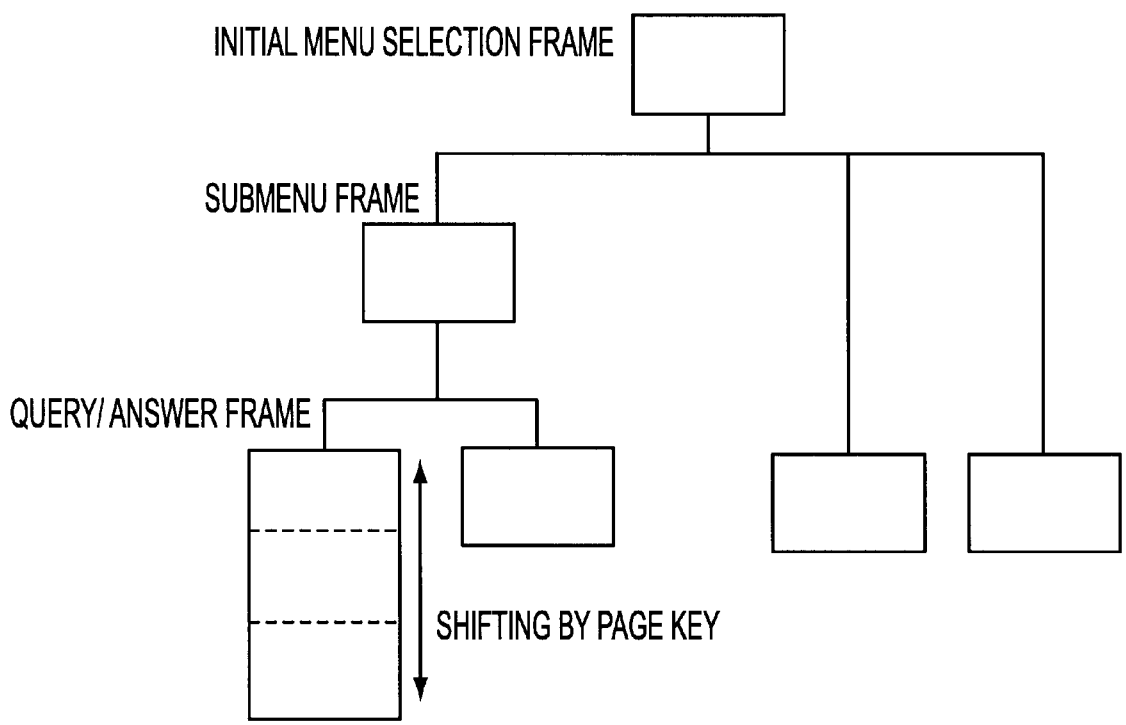
FIG. 25 is a conceptual diagram illustrating the hierarchical structure of display data stored in the host computer.

Various items of information selectively displayed through operation of the page switching keys, for example, the items of information on pages 1 and 6, corresponding to the frames the setting of the appearance inspection and inspection of important parts, are of the same hierarchical level. An outline of the hierarchical structure is schematically shown in FIG. 25.

On the other hand, in the case where the key operated is neither the data transfer key nor the page switching key, the CNC apparatus repeatedly makes determinations in Steps b2 through b10 shown in FIGS. 18 and 19; if operation of a soft key is detected in Step b5, a corresponding input processing is performed (Step b11), and if operation of a cursor movement key is detected in Step b6, a cursor movement processing is executed (Step b12). Such a movement of the cursor, for example, corresponds to the skip of the messages such as Item 1, Item 2, etc. displayed on the display frame 18. If operation of the numeric keypad and the like is detected in Step b7, the entered value is stored, as a character string or numeral string, in a buffer (the aforementioned file "23.5" or "34.5") corresponding to the current cursor position, and each time the value of the character string in the buffer changes, the contents thereof are displayed in the second display area on the CNC apparatus, for example, in region A01 in FIG. 5 (Step b13). The data stored in the buffer is collectively transferred by operating the data transfer key such as the execute key or the like, as already mentioned above.

Further, when the host switching key is operated (Step b8), or a move-to-other-frame key is operated (Step b9), or a communication end key is operated (Step b10), the CNC apparatus executes the loop processing shown in FIG. 18 (i.e., the processing of Step a7), and then again determines whether or not this key-in operation is a request for host switching (Step a8). "Move-to-other-frame" mentioned here denotes a movement from the communication-dedicated frame to a frame for tool path drawing or for machining program editing, i.e., to a CNC-dedicated frame, and differs from the aforementioned switching of the selectively displayable frames accessible from a common initial menu selection frame as a root in the hierarchical structure.

When the request for host switching is detected in Step a8, the CNC apparatus first outputs a line disconnection request to the host computer to which the CNC apparatus has been connected through the RS-232-C/Ethernet converter, and then, referring to the number of the host computer (already input in Step b8) to be connected next, outputs a line connection request to the corresponding host computer (Step a13).

The RS-232-C/Ethernet converter, when it detects the line disconnection request from the CNC apparatus in Step e5, identifies that the detected request is a host disconnection request (Step e6); subsequently, the RS-232-C/Ethernet converter outputs a line disconnection request to the host computer with which it has been in handshaking state (Step e10), whereupon the processing returns to Step e2 for entering standby state waiting for data to be transferred from the CNC apparatus; then, upon receiving the request for line connection with the next host computer (the line connection request output in Step a13), the RS-232-C/Ethernet converter carries out a line connecting operation, similar to that described above, to connect the CNC apparatus to the target host computer.

On the other hand, the host computer, which has been connected to the CNC apparatus until then, detects the line disconnection request in Step f7 of FIG. 23, cuts off the connection with the RS-232-C/Ethernet converter associated with the CNC apparatus (Step f8), and returns to the initial standby state. The processings to be executed by the newly connected host computer is identical with those executed by previous host computer (the previously connected host computer) as to the general flow of processing and operation, except for the fashion of display of menu frame and the configuration of application programs, and, therefore, the processing and operation of the newly connected host computer will not explained here.

FIG. 10 is a diagram showing an example of an initial menu selection frame transferred from the newly connected host computer to the CNC apparatus. In this way, initial menu selection frame is provided with each host computer. The initial menu selection frame shown in FIG. 10 is concerned chiefly with a on-line machining system, and, like the aforementioned example of FIG. 5, various setting and reference frames, such as a machining schedule screen (see FIG. 11), a machining program request screen (see FIG. 12) and a machining instruction reference screen (see FIG. 13) are provided at lower hierarchical levels than the initial menu selection frame; however, as far as the folder structure itself is concerned, this menu is similar to the main menu (see FIG. 25) for the aforementioned assembling system.

Figures 12, 13:
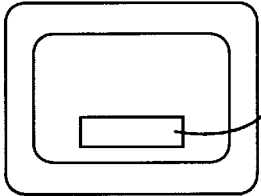
FIG. 12 is a conceptual diagram showing still another display screen state of the CNC apparatus.
FIG. 13 is a conceptual diagram showing still another display screen state of the CNC apparatus.

If, for example, the frame number "1" is selected from the initial frame of the assembling system main menu and input accordingly, the machining schedule reference frame shown in FIG. 11 is displayed, thereby enabling the operator to be informed of the current and next operation schedules, difference between the scheduled operation end time and the current time, etc. On the other hand, when the frame number "2" is selected from the initial frame of the assembling system main menu and input accordingly, the machining program request reference frame shown in FIG. 12 is displayed, and, further, by inputting a program number or schedule number in region A01 of this frame, the operator can be notified of the specifications and name of the part to be produced by the machining program corresponding to the input program or schedule number, the location where the machining program is to be stored, etc. If, after confirming the location where the machining program is stored, the symbol "Y" for requesting the loading of the machining program is input in region A02 of the reference frame shown in FIG. 12, such machining program can be loaded into the CNC apparatus through the host computer. The machining instruction reference frame shown in FIG. 13 is a reference frame to be displayed when selecting the frame number "3" on the initial frame of the assembling system main menu, and, by inputting the specifications or name of a part in region A01, the operator will become able to make reference to a dimensional checking point etc. on a graphic image.

Needless to say, if both the assembling system main menu and the on-line machining system main menu can be stored in the same host computer, it will be unnecessary to switch between different host computers to select main menus of different types. In this embodiment, however, because of restrictions on the memory capacity etc. of the host computer, two or more types of main menus are stored separately in a plurality of host computers.

On the other hand, when the operation of the move-to-other-frame key, not the host switching key, is detected in Step a9, that is, when the movement to CNC-dedicated frame, such as a frame for tool path drawing, machining program editing, etc., is requested, the CNC apparatus stores the frame number of the host computer to terminates the information input/output processing shown in FIG. 17 (Step a14) once, and starts its own processing such as tool path drawing, machining program editing, etc. or machining control for the machine tool, which can be performed by the CNC apparatus.

The frame number of the host computer is stored before being switched to another screen so that the previously displayed frame of the host computer can be restored when the communication-dedicated screen is selected again.

When the frame of the host computer has to be resumed on the communication-dedicated screen, the line connection between the CNC apparatus and the host computer is already established; therefore, upon operation of the communication-dedicated frame request key, the determination in Step a1 becomes Yes. Consequently, the CNC apparatus transfers the screen number of the host computer (stored in Step a14), which was displayed before being switched to the CNC-dedicated frame, to the RS-232-C/Ethernet converter associated therewith (Step a11). On detecting thus-transferred screen number in Step e5 of FIG. 22, the RS-232-C/Ethernet converter outputs a screen transfer request to the host computer (Step e7). Detecting this request in Step f6, the host computer outputs the screen data corresponding to the screen number to the RS-232-C/Ethernet converter in Step g10. Upon detecting this output screen data in Step e8, the RS-232-C/Ethernet converter transfers the data to the CNC apparatus (Step e9). Receiving this data, in Step a12, the CNC apparatus displays the frame corresponding to the frame number, thus restoring the same state as before the switching to the CNC-dedicated frame.

In the case where neither the host switching key nor the move-to-other-frame key have been operated and thus the determinations in both the Steps a8 and a9 are No, this undoubtedly means that termination of the communication function is selected (see Steps b8 to b10). Consequently, the CNC apparatus cuts off the connection between the host computer and the RS-232-C/Ethernet converter and also cuts off the connection with the RS-232-C/Ethernet converter to restore the initial state (Step a10), and terminates all of the data input/output-related processings.

Further, in addition to the above-described individual processesings requiring mutual data input/output between the CNC apparatus and the host computer, one-way transmission of data, such as CNC apparatus status data, machine tool operation information, etc., from the CNC apparatus to the host computer is also carried out.

Among the data transmitted in this way, data concerning the status of the CNC apparatus is detected at every relatively long sampling period, e.g., 30 seconds, and transferred from the CNC apparatus to the host computer, while taking or not taking, the sampling of the machine tool operation information s controlled by a machining program currently in progress; when sampling is necessary, the sampling is executed and stopped in accordance with a sampling start command and a sampling end command, respectively, written in the machining program, the sampling of the machine tool operation information being repeatedly made at every considerably short sampling period, e.g., several milliseconds. Needless to say, the host computer which collects the transferred data like these must always be the same one, for example, the second host computer 2 for CAD/CAM. Thus, prior to the start of the machining control by the CNC apparatus, the aforementioned host switching operation is carried out and the CNC apparatus is connected to the predetermined host computer. The predetermined host computer is not only a server for data collection but also a host computer for sending out emergency messages.

FIG. 20 is a flowchart showing processing for transferring data relating to the status of the CNC apparatus.

On starting the processing for sampling and transfer of data relating to the CNC apparatus status, the CNC apparatus first determines whether or not the connection between the CNC apparatus and the RS-232-C/Ethernet converter and the connection between the RS-232-C/Ethernet converter and the host computer are established (Steps c1 and c2); in this case, naturally the CNC apparatus and the host computer are connected to each other. In the event the CNC apparatus is not connected to the host computer, this is indicative of erroneous host switching by operator or intentional cut off the connection anticipating no need for sampling; in either case, transfer of data is not possible, and thus all the processings to follow are canceled.

On the other hand, when the connections are confirmed in Steps c1 and c2, the CNC apparatus determines whether or not an emergency message has been input from the host computer (Step c3), and if there is no emergency message input, the CNC apparatus determines whether a block transfer request has been input from the host computer and whether block transfer from the CNC apparatus to the host computer has already been started (Step c4). The block transfer request is a command which the host computer sends when requesting the CNC apparatus to transfer the machine tool operation data.

If neither the emergency message nor the block transfer request has been input, the CNC apparatus detects, from its internal memory, data such as the current processing mode, the currently executed machining program number, the type of code of the statement under execution, the occurrence/nonoccurrence of alarm as well as alarm type, the signal input/output state, the current positions of individual axes of the machine tool, etc. (Step c5). Then, the CNC apparatus sets a flag (Step c6) standing for that the determination in Step b16 of FIG. 18 is affirmative (Yes), that is, a flag for inhibiting the operator from transferring data by manual operation, and, in accordance with a data format previously instructed from the host computer, the CNC apparatus stores the CNC apparatus status data, collected in Step c5, in a buffer, and then collectively transfers the same to the host computer (Step c7), this step being followed by resetting of the flag to thereby permit the operator to perform data transfer by manual operation (Step c8). The data thus transferred is stored, together with the current time, in a corresponding one of log files provided in the host computer for the respective CNC apparatuses.

On the other hand, when the block transfer request is detected in Step c4 or the block transfer is already started, the CNC apparatus will not execute Step c5 for the transfer of the CNC apparatus status data, but sets a transfer request flag to end the processing for the current cycle (Step c9), and the transfer of the machine tool operation information is started or continued by a machine tool operation information transmission processing described later. That is, the transfer processing for the machine tool operation information has higher priority than the transfer processing for the CNC apparatus status data.

If an emergency message from the host computer is detected in Step c3, the CNC apparatus reads the message data (display contents) and display information (including a code for changing the color to special color for emergency message) (Step c10), and then identifies the operation mode thereof to thereby determine whether or not the display frame of the display/input device thereof is being used for important work (Step c11). In program editing mode or tool path drawing mode, for example, it is likely that the display screen is used for data entry, and, therefore, a higher priority is given to the use of the display screen for data entry. In such cases, the operator is naturally at the CNC apparatus to perform program editing confirmation of tool path, etc. Further, in cases where the initial frame for menu selection is merely displayed or numerical values representing data of the individual axes during automatic operation are displayed, it is very likely that the operator is doing nothing or has not yet started work, or that the operator is not at the CNC apparatus leaving the operation of the machine tool to the CNC apparatus; therefore, the priority of the use of the display screen is judged to be relatively low.

Figure 26:
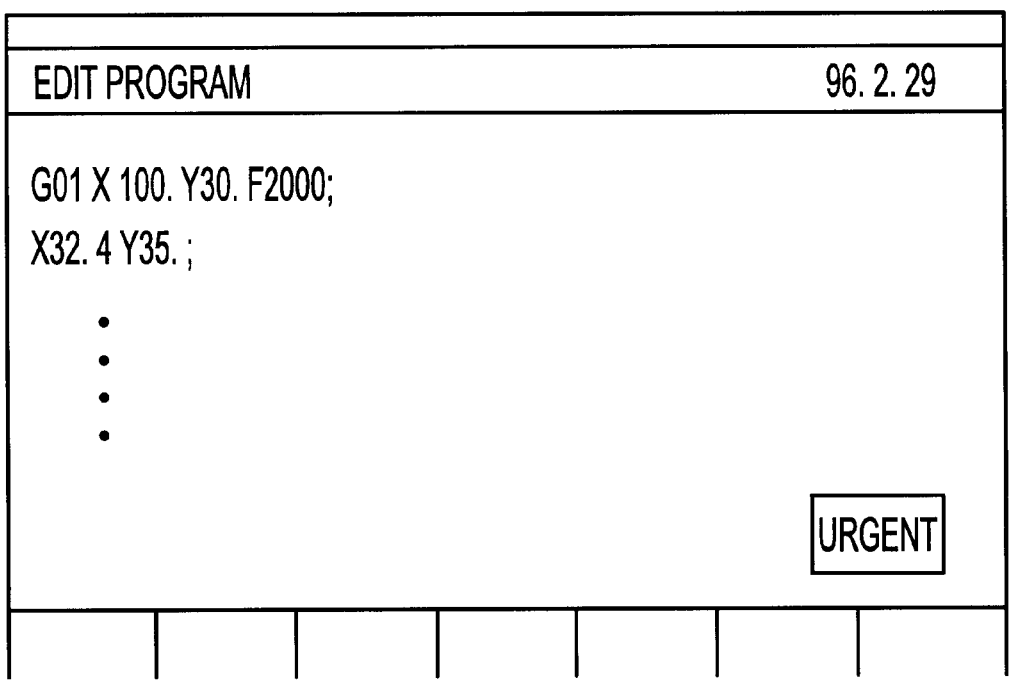
FIG. 26 shows an example of an emergency display screen.
Figure 27:
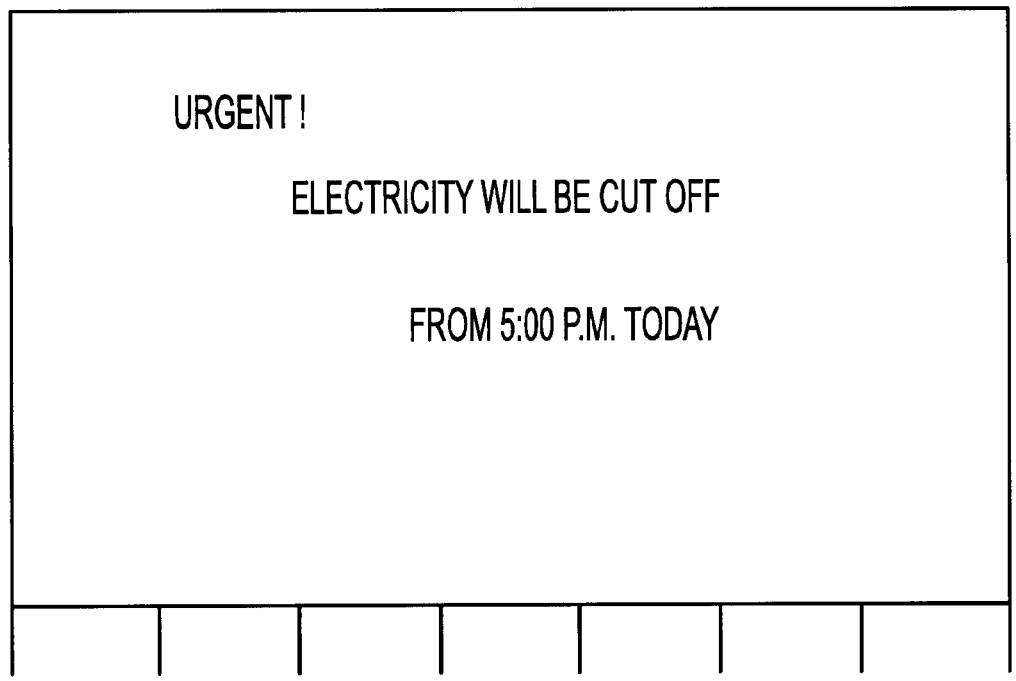
FIG. 27 shows another example of the emergency display screen.

In the former case, the CNC apparatus displays an icon of the emergency message read in Step c10 in such a manner that the icon occupies a small area at a corner of the display screen, for example, as shown in FIG. 26, giving priority to the currently used function of the display screen of the CNC apparatus, to thereby prevent the operator's work from being disturbed by the display of the emergency message. In general, in a situation like this, the operator is likely at the CNC apparatus, so that, the operator can notice the emergency message even if the message is displayed in a small region. Further, in this embodiment, the icon is picked with the cursor and then a file opening command is input, thereby eventually opening the text data (or graphic data) of the emergency information to switch to the display as shown in FIG. 26. Further, in the latter case, since the CNC apparatus is in a state in which the function of its display screen is used little by the operator, the CNC apparatus immediately takes up the text data (or graphic data) of the emergency message read in Step c10, and displays the message on an enlarged scale, for example, using the entire display screen as shown in FIG. 27. In this case, the operator is very likely away from the CNC apparatus, so that it is preferable for the message to be displayed as large as possible in order to call the operator's attention and make him or her take notice of the emergency message (The foregoing is executed in Step c12).

In this embodiment, when an emergency message from the host computer is detected in Step c3, the processings relating to the CNC apparatus status data transfer (Step c5) and the transfer request flag setting (Step c9) are made unexcutable; however after the reading of the emergency message is completed, data transfer from the CNC apparatus to the host computer is possible. Thus, it is not always necessary to terminate these processings after execution of Step c12, and, after Step c12 is executed, Step c4 and the subsequent steps can of course be executed to continue the processing.

Figure 21:
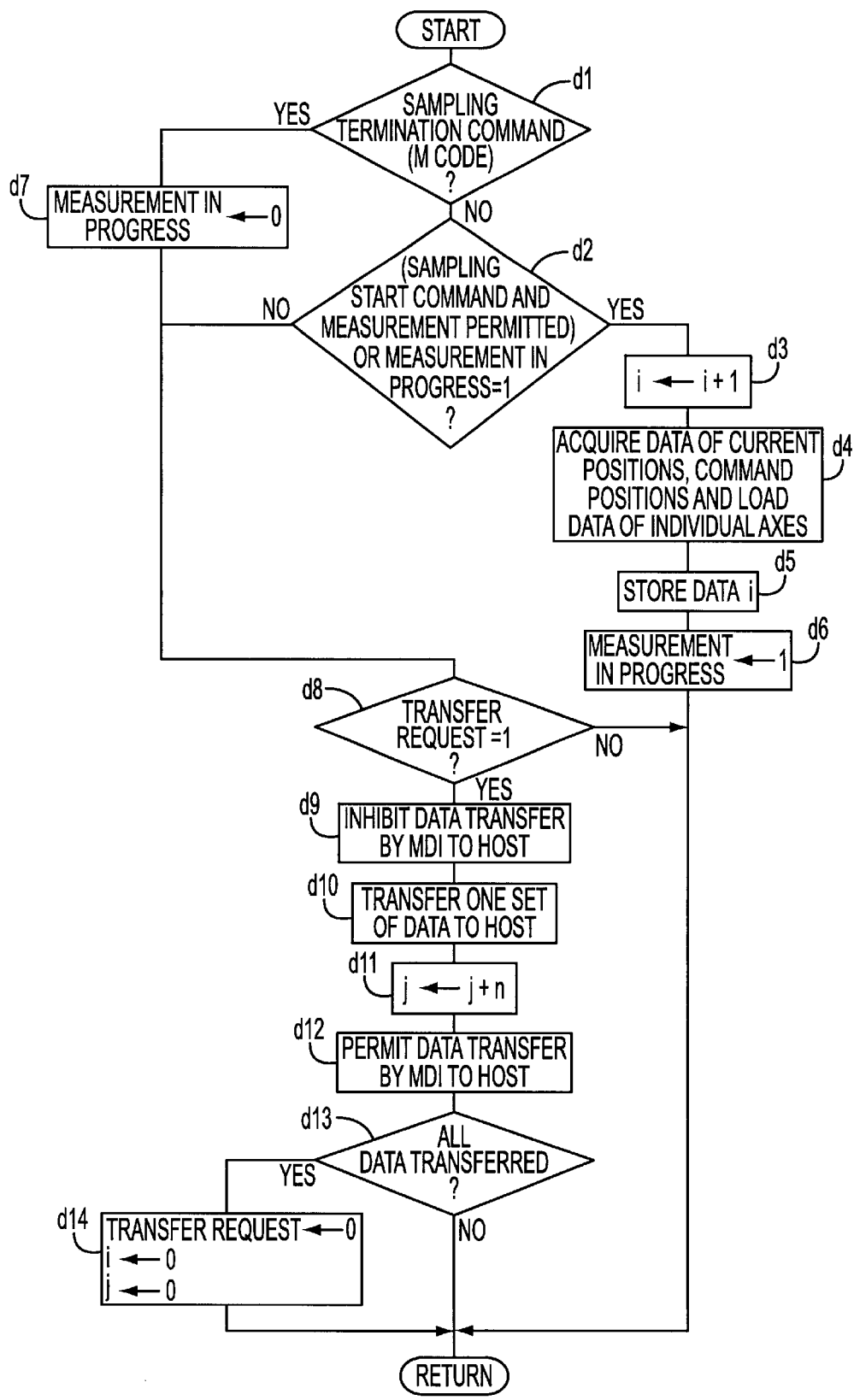
FIG. 21 is a flowchart schematically showing another information transfer processing to be executed by the CNC apparatus.

FIG. 21 is a flowchart showing processing to be executed by the CNC apparatus for sampling the machine tool operation information and for transferring the operation information. As already mentioned, compared with the status data transfer processing (FIG. 20) described above, this processing is repeatedly executed at every considerably short period, for example, on the order of milliseconds, more specifically, at every distribution period in which the CNC apparatus distributes a move command to a servo circuit for each axis.

On starting this processing, the CNC apparatus first determines whether or not the statement currently read from the machining program in progress, is an M code standing for a sampling end command (Step d1). If the currently read statement is not the sampling end command, the CNC apparatus determines whether or not this statement is an M code standing for a sampling start command and whether or not a measuring state storage flag is set (Step d2).

The above does not mean that the statements as the object of execution are read at every short period on the order of milliseconds; the determinations in Steps d1 and d2 are made by accessing the statements to be executed which are once read from the machining program and temporarily stored in a statement storage register (in kana characters) of the CNC apparatus.

Further, the initial value of the measuring state storage flag is initially set to "0", which indicates that the measurement is not under execution, and the initial values of index i representing a total number of samplings and index j representing the number of transferred samples are set to "0" respectively.

When the determinations in Steps d1 and d2 are No for the both, that is, when the currently read statement is neither the M code for the sampling end command nor the M code for the sampling start command and the measuring state storage flag is not set, the CNC apparatus then determines whether or not a block transfer request flag (see FIG. 20) is set (Step d8). If the transfer request flag is not set, the CNC apparatus simply ends the operation information transfer processing for the present cycle.

Consequently, before the M code for the first sampling start command is read from the machining program, the CNC apparatus repeatedly executes only Steps d1, d2 and d8 of the operation information transfer processing at every predetermined period. If, during this period, a block transfer request is received from the host computer, Step d9 and the subsequent steps are executed, but the operation information transferred in this case contains no data. Alternatively, whether or not the value of the index i is greater than "0" may be determined when the block transfer request is detected, and Step d9 and the subsequent steps may be executed only when the value of the index i is greater than "0".

As described previously, when the M code for the sampling start command is read from the machining program while only the Steps d1, d2 and d8 are repeatedly executed, the CNC apparatus increases, by an increment of 1, the value of the index i, which represents the total number of samplings (Step d3). Subsequently, the CNC apparatus reads the current positions (actual positions) of the individual axes calculated based on feedback signals from the machine tool, commanded positions (target positions) according to position control, and current values of loads (values estimated based on actual electric current values or by an observer) on the individual axes (Step d4), writes these items of data in an operation information storage file at a storage location corresponding to the value of the index i (Step d5), and sets the measuring state storage flag (Step d6).

After the measuring state storage flag is set, in the subsequent processing cycles, only Steps d1 through d6 are repeatedly executed, and, accordingly, the operation information obtained at the sampling periods is successively written at the storage location of the operation information storage file. During this period, no confirmation is made as to the set state of the block transfer request flag; therefore, even when a block transfer request is input from the host computer, the processing relating to the operation information transfer will not be carried out at all. Since the block transfer request flag is set in the aforementioned status data transfer processing (FIG. 20), the flag setting itself is possible, and the processing relating to the operation information transfer can be started after completing the sampling process.

The M code for the sampling start command and the M code for the sampling end command, as statements, can be written at any desired locations in machining programs, and, therefore, the sampling period can be set as needed on a machining path according to one machining block, as being a minimum unit, such as circular interpolation, linear interpolation, etc.

When the M code for the sampling end command is read from the machining program while the sampling is repeated in this manner, the CNC apparatus resets the measuring state-storage flag (Step d7), and determines whether or not a block transfer request has been input from the host computer during this sampling process (Step d8). If no block transfer request has been detected, it is naturally unnecessary to transfer the sampling data and therefore, the CNC apparatus ends the operation information transfer processing for the present cycle while holding the sampling data obtained until then in the operation information storage file. Thus, in such a situation, when an M code for the sampling start command is again read from the machining program, data of the next sampling period is written on the storage region next to the storage region of a current value of the index i, in the same manner as described above.

When a block transfer request from the host computer is finally detected, the CNC apparatus sets the flag (Step d9), which makes the determination in Step b16 of FIG. 18 affirmative (Yes), that is, the flag which inhibits the operator from manually transferring data. Then, in accordance with the data format previously instructed from the host computer, the CNC apparatus stores first n sets of the data, which has been stored in the operation information storage file, in a buffer and then transfers the same to the host computer (Step d10). After increasing the value of the index j by an increment of n to update the number j, representing the number of items of the transferred data (Step d11), the CNC apparatus resets the above flag to thereby permit manual transfer data (Step d12) by the operator.

Subsequently, the CNC apparatus determines whether or not all the data in the operation information storage file has been transferred to the host computer (whether or not $j \geq i$ is fulfilled) (Step d13), and, if all the data has been transferred, the CNC apparatus resets the block transfer request, as well as the values of the indexes i and j to thereby clear the contents of the operation information storage file (Step d14), terminating the operation information transfer processing for the present cycle.

However, the transmittable number of items of data is limited (e.g., to n items) due to the capacity of the transmission channel, and, besides, the sampling period set in the machining program can be considerably long; therefore, a single transfer operation is not always sufficient to convey all the data.

Thus, When Step d10 is not sufficient to transfer all the data, that is, when the determination in Step d13 is No, the CNC apparatus retains the block transfer request, the values of the indexes i and j and the contents of the operation information storage file as they are, and transfers the remaining data by the processing in the subsequent cycles. In this case, it is necessary that the contents of the operation information storage file remain unchanged, so that, writing of data in the operation information storage file is inhibited. As a result, any new sampling processing cannot be performed (measurement inhibited state), and even if an M code for the sampling start command is read in Step d2, the CNC apparatus ignores the M code and proceeds to Step d8.

Thereafter, the CNC apparatus repeatedly executes Steps d9 through d12 in the same manner as aforesaid until all the data in the operation information storage file is transferred to the host computer and thus $j \geq i$ becomes fulfilled. Then, n pieces of operation information are transferred to the host computer in each processing cycle, and, when transfer of all the data is completed, the CNC apparatus resets the block transfer request and the indexes i and j, thus clearing the contents of the operation information storage file, in Step d14. The foregoing procedure, however, is applicable in the case where there is only one operation information storage file. Thus, where another similar operation information storage file is provided so that sampling data can be written in the other operation information storage file while the data in operation information storage file is being transferred, a new sampling process can be started even in the case where an M code for a new sampling start command is read during the transfer of data from the one operation information storage file.

The operation information of the various machine tools transferred to the host computer is classified according to machining programs, CNC apparatuses or machine tools, and stored in a storage device, for example, a hard disk or the like, of the host computer. The stored information can be modified in various ways and displayed on the display device of the host computer at the request of the operator of the host computer, so that the information can be used for correction etc. of the machining programs.

Figures 14, 15:
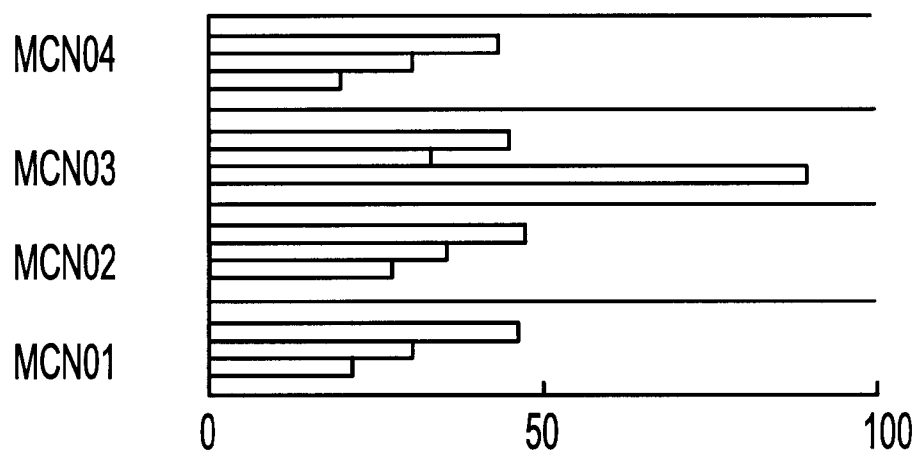
FIG. 14 is a conceptual diagram showing a display screen state of a host computer.
FIG. 15 is a conceptual diagram showing another display screen state of the host computer.

In the host computer are installed various application programs for modifying or displaying operation data of the machine tools, so that, when one of the data items such as total operation hours, alarm analysis, production schedule, maintenance/management system, etc. is selected on an initial menu selection frame on the screen of FIG. 14, which is provided for selecting an item of machine tool data for display, the corresponding application program is started for enabling various data to be displayed on the display screen of the host computer. For example, when the item "totaling of operation hours," is selected, a bar graph created based on the information obtained in Step c5 of FIG. 20 is displayed as shown in FIG. 15.

Further, in the case where the host computer has a CAD/CAM function, correction machining command data can be corrected based on the aforementioned machine tool operation data, that is, the current positions (actual positions) of the individual axes (feed shaft, spindle, etc.), the load data of the individual axes, and measurement data obtained by measuring a machined workpiece with a three-dimensional measuring instrument 6. For example, the CAD/CAM stores the data of the machining path, so that the stored data can be compared with the current position (actual position) data of the individual axes sampled at high speed, and the difference obtained is added to or subtracted from the machining command data, thereby correcting the machining command data. Also, the result of measurement by means of the three-dimensional measuring instrument 6 may be compared with the machining path generated by CAD/CAM, and the obtained difference may be used for correction. Moreover, when using the load data of the feed shaft or the spindle, the rate of change in the load data may be utilized to correct the corresponding machining command. Further, the values for correction may be determined by a separate comparison of the position data and the load data with the data obtained by the three-dimensional measuring instrument, or by a calculation based on the combination of these data.

In the embodiment shown in FIGS. 5 through 13, the display screen of the CNC apparatus is split into right area and left area, so that the left-hand area serves as the first display area for displaying information from the first or second host computer 1, 2 while the right-hand area serves as the second display area for displaying information entered by the operator through operation of the ten key, character keys, cursor movement keys, etc. Thus, the areas A01 and A02, in which the information input by the operator through operation of the numeric keypad, character keys, cursor-movement keys, etc. is displayed, both belong to the second display area on the right-hand side of the screen.

Needless to say, the screen may be split into upper and lower sections to provide the first and second display areas as shown in FIG. 2, and also the third display area may be, provided in the form of a window to be superposed on these areas. Further, this window may be used as the uppermost layer for displaying a message and the like concerning urgent matter, thereby making it is possible for the host computer side to make urgent matter or the like known to the operators of the CNC apparatuses, regardless of the state in which the screens of the individual CNC apparatuses are currently used.

According to the present invention, information collected on the host computer side can immediately be displayed on the display/input device of the CNC apparatus, and also information entered by the operator through operation of the CNC apparatus can be confirmed on the same screen. Hence, two-way transmission of information for display between the CNC apparatus and a plurality of host computers without the need of special display means and relay means such as a personal computer, contributing not only to the reduction of FA network system construction cost but also to the reduction of installation space for the devices and resulting effective use the floor space of the factory.

Further the display attributes of the CNC apparatus side can be switched in accordance with the display attributes of the information transferred to the CNC apparatus from the host computer, and, therefore, not only text data or the like but also graphic data and the like of various formats can be freely displayed on the CNC apparatus. Further, since the display attributes are provided by the host computer, the programs need not to be modified on the CNC apparatus side.

Further, information can be transferred page by page from the host computer to the CNC apparatus, so that, the information can be displayed on the display screen with the display attributes switched for each page.

Further, since it is possible to switch between the display frame for the host computer-originated information and the display frame dedicated to the CNC apparatus, full-screen display on the display/input device is available for work requiring a large display area, such as tool path drawing, program editing, etc.

When the host computer collects information from the CNC apparatus, the time at which the CNC apparatus status data is transmitted, the program number which the CNC apparatus then recognizes, the current positions of servomotors connected to the CNC apparatus, information on the current instructions from the CNC apparatus, cutting load information of the servomotors or spindle motor, alarm information, etc. are automatically logged in the host computer, thus permitting automatic control of the information on each of a plurality of CNC apparatuses.

Furthermore, the format of files and the like, used when data is transferred from the CNC apparatus to the host computer is predefined by input/output information provided by the host computer, and, therefore, it is unnecessary to convert files for format adjustment on the host computer side, whereby the load on the host computer lessens, ensuring smooth operation of the entire system.

Further, when emergency information is transferred from the host computer to the CNC apparatus, the CNC apparatus itself determines its current status and selects an appropriate display method of the emergency message, so that the emergency information can be displayed depending on the state in which the CNC apparatus is currently used and without impairing the function of display screen as a user interface for program editing or tool path drawing.

What is claimed is:

1. A data display/input method for a CNC apparatus in a factory automation system having a network connecting a host computer and the CNC apparatus to each other, comprising:

transmitting display contents and input/output information, created in the host computer, from the host computer to the CNC apparatus as a terminal equipment of the network, the input/output information comprising display attributes and formats associated with the display contents;

displaying the display contents on a screen of a display/input device of the CNC apparatus, in accordance with the input/output information provided by the host computer; and displaying data manually input to the CNC apparatus on the same screen of the display/input device on which the display contents are displayed according to the format provided by the host computer.

2. The method according to claim 1, further comprising transmitting the data manually input to the CNC apparatus to the host computer.

3. The method according to claim 1, wherein the input/output information comprises information of a display area, a display position, display colors, a control of the screen of the display/input device of the CNC apparatus, and a display position and a format of data manually input to the CNC apparatus.

4. The method according to claim 1, wherein the input/output information comprises specifications of contents and functions of function keys to be displayed on the screen of the display/input device of the CNC apparatus.

5. The method according to claim 1, wherein the display contents comprise character information and graphic information, and said displaying the display contents comprises decoding the character information and the graphic information and displaying the decoded information on the screen of the display/input device.

6. The method according to claim 1, wherein said transmitting display contents comprises transmitting the display contents page by page.

7. The method according to claim 2, wherein said transmitting the data manually input comprises transmitting the data manually input to the CNC apparatus page by page.

8. The method according to claim 1, wherein a frame for displaying the display contents and a frame for displaying information on a program subject to control of the CNC apparatus and a current position of a servomotor connected to the CNC apparatus are selectively switchable by means of soft keys of the display/input device.

9. The method according to claim 1, wherein the display contents comprising emergency information and the input/output information comprising a code for changing a display color of the emergency information to be displayed on the screen of the display/input device of the CNC apparatus; and said displaying the display contents on the screen of the display/input device in accordance with the input/output information comprises changing the display in accordance with an operating status of the CNC apparatus.

10. The method according to claim 1, further comprising:

splitting a display screen of the CNC apparatus into first and second display areas, wherein the data transferred from the host computer to the CNC apparatus is displayed in the first display area while the data manually input to the CNC apparatus is displayed in the second display area.

11. The method according to claim 1, further comprising:

splitting a display screen of the CNC apparatus into first and second display areas; and displaying the data created in, and transferred from, the host computer to the CNC apparatus in the first display area and displaying the data manually input to the CNC apparatus in the second display area.

12. A data display/input method for a CNC apparatus in a factory automation system having a network connecting a host computer and the CNC apparatus to each other, comprising:

monitoring a status of the CNC apparatus as a terminal equipment of the network within the CNC apparatus; and simultaneously transmitting data indicating at least two kinds of statuses of the CNC apparatus from the CNC apparatus to the host computer, the simultaneously transmitted data comprising a program number which the CNC apparatus currently recognizes, a current position of a servomotor connected to the CNC apparatus, information of commands issued from the CNC apparatus, information of a cutting load on the servomotor or a spindle motor, and information of an alarm and time of the transmission, wherein said monitoring a status comprises monitoring the statuses of the CNC apparatus at every predetermined period, and said simultaneously transmitting data comprises transmitting the information monitored to the host computer within the predetermined period.

13. A data display/input method for a CNC apparatus in a factory automation system having a network connecting a host computer and the CNC apparatus to each other, comprising:

monitoring a status of the CNC apparatus as a terminal equipment of the network within the CNC apparatus; and simultaneously transmitting data indicating at least two kinds of statuses of the CNC apparatus from the CNC apparatus to the host computer, the simultaneously transmitted data comprising a program number which the CNC apparatus currently recognizes, a current position of a servomotor connected to the CNC apparatus, information of commands issued from the CNC apparatus, information of a cutting load on the servomotor or a spindle motor, and information of an alarm and time of the transmission, wherein said monitoring a status comprises monitoring the statuses of the CNC apparatus at every predetermined period, and said simultaneously transmitting data comprises storing the information monitored for a plurality of predetermined periods and transmitting the information monitored to the host computer in response to a request from the host computer.

\* \* \* \* \*

UNITED STATES PATENT AND TRADEMARK OFFICE
CERTIFICATE OF CORRECTION

PATENT NO. : 6,338,003 B1
DATED : January 8, 2002
INVENTOR(S) : Kamiguchi et al.

It is certified that error appears in the above-identified patent and that said Letters Patent is hereby corrected as shown below:

<u>Title page,</u>
Item [75], delete "-gun"; change "Oshino-mura" to -- Minamitsuru --.

<u>Column 1,</u>
Line 7, change "method" to -- methods --;
Line 12, delete "There are known a", insert -- A --; after "system" insert -- is known --;
Line 16, change "system" to -- systems --;
Line 22, change "type" to -- system --;
Line 26, change "so that" to -- accordingly --;
Line 28, delete ", and", insert -- . --;
Line 29, change "thus" to -- Thus --;
Line 31, insert -- in -- after "problem";
Line 41, change "so that every" to -- accordingly --;
Line 43, insert -- previously incorporated -- after "the";
Line 53, insert -- in -- before "that";
Line 59, change "complicate" to -- complicated --;
Line 67, delete "not only", insert -- not only a -- after "becomes".

<u>Column 2,</u>
Line 1, insert -- , -- after "operator";
Line 66, change "; therefore" to -- . Therefore --.

<u>Column 3,</u>
Line 24, insert -- the -- after "to";
Line 27, insert -- such -- after "information";
Line 36, insert -- the -- after "for";
Line 38, change "are" to -- is --;
Line 40, change "period" to -- periods --;
Line 41, change "period" to -- periods --;
Line 65, insert -- , -- after "needed";
Line 66, insert -- such -- before "as"; change "and thus" to -- when --;

<u>Column 4,</u>
Line 1, delete ",";
Line 2, change "thereby call" to -- bring the information to --.

<u>Column 5,</u>
Line 28, change "functions" to -- function --;

UNITED STATES PATENT AND TRADEMARK OFFICE
CERTIFICATE OF CORRECTION

PATENT NO.     : 6,338,003 B1
DATED          : January 8, 2002
INVENTOR(S)    : Kamiguchi et al.

It is certified that error appears in the above-identified patent and that said Letters Patent is hereby corrected as shown below:

<u>Column 5 cont'd,</u>
Line 32, insert -- a -- after "that";
Line 35, delete "the";
Line 37, delete "of";
Line 42, change "has" to -- have --.

<u>Column 6,</u>
Line 1, change "second-host" to -- second host --;
Line 23, change "Hereinafter" to -- hereinafter --;
Line 52, change "of" to -- on -- (first occurrence);

<u>Column 7,</u>
Line 7, insert -- a -- after "as";
Line 15, insert -- are -- after "data";
Line 18, delete ",";
Line 64, delete "are".

<u>Column 8,</u>
Line 31, change "be now" to -- now be --;
Line 50, change "of" to -- in --.

<u>Column 10,</u>
Line 17, delete "is".

<u>Column 11,</u>
Line 23, delete "is associated";
Line 33, change "frame" to -- frames --;
Line 48, change "making" to -- transferring --;
Line 49, delete "being transferred";
Line 50, change "making" to -- clearing --;
Line 51, delete "being cleared".

<u>Column 12,</u>
Line 44, insert -- the -- after "when";
Line 55, insert -- can -- after "2".

UNITED STATES PATENT AND TRADEMARK OFFICE
CERTIFICATE OF CORRECTION

PATENT NO. : 6,338,003 B1
DATED : January 8, 2002
INVENTOR(S) : Kamiguchi et al.

It is certified that error appears in the above-identified patent and that said Letters Patent is hereby corrected as shown below:

Column 13
Line 5, insert -- the -- after ",";
Line 11, change "makes" to -- displays --;
Line 12, delete "to be displayed";
Line 14, change "with" to -- for --;
Line 15, delete "is";
Line 42, insert -- the -- after "on".

Column 14,
Line 6, delete "may of";
Line 51, insert -- of -- after "number";
Line 57, insert -- for -- after "frames".

Column 15,
Line 21, " "Move-to-other-frame" begins a new paragraph;
Line 63, insert -- be -- after "not".

Column 16,
Line 2, change "a" to -- an --;
Line 52, change "terminates" to -- terminate --.

Column 17,
Line 37, change "informations" to -- information --;
Line 65, insert -- of -- after "off".

Column 19,
Line 22, change "The" to -- the --;
Line 27, change "unexcutable" to -- unexecutable --.

UNITED STATES PATENT AND TRADEMARK OFFICE
CERTIFICATE OF CORRECTION

PATENT NO. : 6,338,003 B1
DATED : January 8, 2002
INVENTOR(S) : Kamiguchi et al.

It is certified that error appears in the above-identified patent and that said Letters Patent is hereby corrected as shown below:

<u>Column 23,</u>
Line 59, insert -- the -- after "of";
Line 98, change "for" to -- may be --.

Signed and Sealed this

Twelfth Day of November, 2002

*Attest:*

*Attesting Officer*

JAMES E. ROGAN
*Director of the United States Patent and Trademark Office*